(12) United States Patent
Coombes et al.

(10) Patent No.: US 9,292,741 B2
(45) Date of Patent: Mar. 22, 2016

(54) SYSTEM, APPARATUS AND METHOD FOR MAPPING

(71) Applicant: 1626628 ONTARIO LIMITED, Toronto (CA)

(72) Inventors: Anthony C. Coombes, Toronto (CA); Marcy L. Burchfield, Toronto (CA); Wolfhard Geile, Ottawa (CA)

(73) Assignee: 1626628 Ontario Limited, Toronto (CA)

(*) Notice: Subject to any disclaimer, the term of this patent is extended or adjusted under 35 U.S.C. 154(b) by 0 days.

(21) Appl. No.: 14/084,795

(22) Filed: Nov. 20, 2013

(65) Prior Publication Data

US 2014/0078149 A1 Mar. 20, 2014

Related U.S. Application Data

(63) Continuation of application No. 13/693,103, filed on Dec. 4, 2012, now Pat. No. 8,605,518, which is a continuation of application No. 13/154,017, filed on Jun. 6, 2011, now Pat. No. 8,346,471, which is a (Continued)

(51) Int. Cl.
*G06K 9/00* (2006.01)
*G06T 11/20* (2006.01)
(Continued)

(52) U.S. Cl.
CPC ............ *G06K 9/00476* (2013.01); *G01C 21/32* (2013.01); *G06T 11/20* (2013.01); *G09B 29/10* (2013.01); *G09B 29/106* (2013.01)

(58) Field of Classification Search
CPC ......... G01C 21/26; G01C 21/367; G01S 7/22

USPC .......... 701/208, 50, 454, 439, 450, 408, 409; 703/1; 705/35
See application file for complete search history.

(56) References Cited

U.S. PATENT DOCUMENTS

| | | | | |
|---|---|---|---|---|
| 5,920,276 A | * | 7/1999 | Frederick | G01S 7/22 342/179 |
| 5,978,723 A | * | 11/1999 | Hale | A01B 79/005 701/409 |

(Continued)

FOREIGN PATENT DOCUMENTS

| | | |
|---|---|---|
| CA | 2084291 | 8/1992 |
| CA | 2483615 | 11/2003 |
| WO | 92/15080 A1 | 9/1992 |

OTHER PUBLICATIONS

Translated Chinese office action that corresponds to the parent application of this US application; mailed Feb. 29, 2012 (12 pages).

(Continued)

*Primary Examiner* — Thomas G Black
*Assistant Examiner* — Wae Louie
(74) *Attorney, Agent, or Firm* — Roach Brown McCarthy & Gruber, P.C.; Kevin D. McCarthy

(57) ABSTRACT

The present invention provides a novel apparatus and method for mapping of urban regions. An apparatus includes the remote sensing equipment that is connected to a computer processor. The remote sensing equipment gathers imaging data about an urban region. The computer processor interprets the imaging data to generate a map of the urban region comprising representations that identify a first set of indicia representing physiographic characteristics, a second set of indicia representing different types of built forms, and a third set of indicia representing patterns of human activity associated with both the physiographic characteristics and the built forms. The map can also include a fourth set of indicia representing an intensity level that at least one of the other types of indicia occurs.

5 Claims, 18 Drawing Sheets

Related U.S. Application Data continuation of application No. 12/944,905, filed on Nov. 12, 2010, now Pat. No. 7,979,205, which is a continuation of application No. 11/257,047, filed on Oct. 25, 2005, now Pat. No. 7,856,312, which is a continuation of application No. PCT/CA2004/002143, filed on Oct. 25, 2005.

(60) Provisional application No. 60/530,283, filed on Dec. 18, 2003.

(51) Int. Cl.
  *G09B 29/10* (2006.01)
  *G01C 21/32* (2006.01)

(56) References Cited

U.S. PATENT DOCUMENTS

| | | | | | |
|---|---|---|---|---|---|
| 5,995,894 | A | * | 11/1999 | Wendte | A01D 41/127 701/1 |
| 7,164,883 | B2 | * | 1/2007 | Rappaport | H04W 16/20 455/3.01 |
| 7,542,882 | B2 | * | 6/2009 | Agrawala | G01C 21/367 701/14 |
| 7,587,276 | B2 | * | 9/2009 | Gold | G01C 21/26 340/989 |
| 7,643,936 | B1 | * | 1/2010 | Boxberger | H04W 24/08 340/995.19 |
| 7,856,312 | B2 | * | 12/2010 | Coombes | G09B 29/10 340/995.1 |
| 7,979,205 | B2 | * | 7/2011 | Coombes | G09B 29/10 340/995.1 |
| 8,103,445 | B2 | * | 1/2012 | Smith | G08G 1/0962 340/995.14 |
| 2003/0023412 | A1 | * | 1/2003 | Rappaport | H04W 16/20 703/1 |
| 2006/0136126 | A1 | * | 6/2006 | Coombes | G09B 29/10 701/532 |
| 2006/0238380 | A1 | * | 10/2006 | Kimchi | G01C 21/26 340/995.1 |
| 2006/0238383 | A1 | * | 10/2006 | Kimchi | G01C 21/26 340/995.1 |
| 2007/0162372 | A1 | * | 7/2007 | Anas | G06Q 10/04 705/35 |
| 2011/0074783 | A1 | * | 3/2011 | Coombes | G09B 29/10 345/426 |

OTHER PUBLICATIONS

Translation of "Contemporary Population Density", section 1, 3, and chapter 3, Jiangsu Provincial Annals: Population Annals, Jiangsu Province Local History Compilation Committee, Fangzhi Press, Nov. 1999 (5 pages).

European Search Report for corresponding European patent application—mailed Sep. 22, 2011—9 pages.

German Luftwaffe: "WWII Aerial Photos and Maps—Stalingrad" May 8, 1945 (according to the European search report), 1 page.

Royal Commission of the Ancient and Historical Monuments of Scotland: The National Collection of Aerial Photography—Sep. 2, 2011 (according to the European search report)—1 page.

Barnsley et al., "Determining urban land use of buildings identified in LIDAR and multispectral image data" Remotely Sensed Cities, edited by Victor Mesev, Taylor & Francis, London, Mar. 2003, pp. 83-108 (26 pp.).

Imhoff et al. "The use of multisource satellite and geospatial data to study the effect of urbanization on primary productivity in the US" NASA Goddard Space Flight Center, MD, IEEE Transactions, vol. 38, Issue 6, Nov. 2000, pp. 2549-2556 (8 pp).

Anderson et al. "A land use and land cover classification system for use with remote sensor data," Geological Survey Professional Paper 964, Jul. 7, 1976, pp. 2-13 (13 pp).

Publication date of following document established by Internet Archive Wayback Machine, http://web.archive.org/web/*/http://sgbmaps.com: Photography and Mapping at SBG, made public May 1, 2003, accessed Feb. 17, 2005, http://www.sgbmaps.com/mapping.htm (2pp).

Publication date of following document established by Internet Archive Wayback Machine, http://web.archive.org/web/web/20040312070003/www.aeromap.com/community_development.htm: Applications for Community Development made public Sep. 21, 2003, accessed Feb. 17, 2005, http://www.aeromap.com/community_development.htm (2pp).

Publication date of following document established by Internet Archive Wayback Machine, http://web.archive.org/web/web/200403120620957/www.aeromap.com/about_aeromap.htm: AeroMap US Who We Are made public Sep. 21, 2003, accessed Feb. 17, 2005, http://www.aeromap.com/about_aeromap.htm (3pp).

* cited by examiner

SYSTEM, APPARATUS AND METHOD FOR MAPPING

PRIORITY CLAIM

The present application claims priority as a continuation of U.S. patent application Ser. No. 13/693,103, filed on Dec. 4, 2012 (now allowed), which is a continuation of U.S. patent application Ser. No. 13/154, 017, filed on Jun. 6, 2011 (U.S. Pat. No. 8,346,471); which is a continuation of U.S. patent application Ser. No. 12/944,905, filed on Nov. 12, 2010 (U.S. Pat. No. 7,979,205), which is a continuation of U.S. patent application Ser. No. 11/257,047 filed on Oct. 25, 2005 (U.S. Pat. No. 7,856,312); which is a continuation of PCT Patent Application Number PCT/CA2004/002143, filed on Dec. 16, 2004, which claims priority from U.S. Provisional Patent Application No. 60/530,283, filed on Dec. 18, 2003, the contents of which are incorporated herein by reference.

FIELD OF THE INVENTION

The present invention relates generally to cartography and more particularly relates to mapping of urban regions.

BACKGROUND OF THE INVENTION

The twentieth century, particularly, saw the exponential growth of urban regions throughout the world, and in its latter half, the quantum development of suburban districts around the peripheries of cities, fuelled by expressways and the dominance of the automobile-based society. This condition, in which the majority of North Americans, for example, now live in suburbs with low rates of built density and human activity, is generally unable economically to sustain mass transportation. Residence, work, shopping and leisure are not only low in density, and highly land consuming, but activities are generally segregated and separate. In consequence, there is now widespread concern for the effects of such dependence on the automobile—in air pollution, greatly increasing delays, in the increasing aggregate traveling that decreases the quality of peoples lives in costs, time and difficulties in getting to jobs, and in many other respects.

A range of policies and practices have been promoted to deal with this situation, developing forms of land use and transportation in combination, so as to conserve energy, minimize emissions of pollutants, encourage accessibility while minimizing mobility—for example, by developing intensive activity centres around public transport nodes. Regions around the globe are involved in efforts to translate these ambitions into regional strategic development frameworks.

In general, as the world population becomes more concentrated in urban regions, the quality of life in any given urban region is greatly affected by how well the urban region is equipped with infrastructure to support the needs of the local population. Urban planning is a well-known discipline that is used to plan how such infrastructure is added, replaced and maintained. Urban planning also encompasses a number of other issues as will occur to those of skill in the art.

At least in developed countries, most urban regions implement varying degrees of urban planning. The process is often heavily influenced by political factors, as issues around taxation and property rights are necessarily intertwined with the urban planning process. Recently in North America, there has been a trend towards "lean government" policies, wherein government-based centralized urban planning is largely abandoned in favour of allowing the urban region to grow in a laissez-faire manner, on the belief that the free market is the best determiner as to how the area should grow. Still other administrations may implement a more activist policies, involving a great deal of centralized planning, with the view that government controlled central planning is the most efficient way to serve the needs of the local population. Of course, the approach for any given region usually lies between these extremes. Regardless of the chosen approach, one problem with prior art urban mapping and data collection techniques is that there is little in the way of hard-data that can be analyzed to provide an objective view as to how urban planning can be implemented most effectively.

The hard-data that exists today, which has been collected inconsistently across a region, suggests that more data, and the right kind of data, could be extremely effective in urban planning. For example, as of 2003, it is known that the city of Toronto has a subway system that supports itself largely out of the fare-box, with little reliance on government subsidies. It is hypothesized that a major factor contributing to this phenomenon is that there is a large population density that lives ("residential district") adjacent to subway stations, and there is at east one concentrated area in the downtown core where that population works ("employment district") that is also adjacent to subway stations. A similar phenomenon can be observed in New York. The effort required to generate a report to support this hypothesis, however, is enormous, complex, time-consuming and costly. As one approach, the effort could involve collecting street maps and subway maps of Toronto, and then conducting door-to-door surveys in both the residential and employment districts to verify that people are actually using the subways to commute to work. Finally, the data collected from the door-to-door surveys may then be correlated with the maps to ultimately arrive at a report with a conclusion that supports the hypothesis. However, it can be noted that the report includes only a few sets of data points, and does not include other data that may influence whether or not simple densities of residential districts and employment districts is sufficient to support subway lines. Such a report also does not describe the structure of the built environment which dictates the densities. Further, such a report is not readily comparable with how other Urban regions handle transport from residential districts to employment districts, to provide an objective assessment as to which urban region is best handling its transportation needs. More complex questions as to how a particular urban region functions in relation to another will occur to those of skill in the art, and the generation of reports to answer such questions will face similar hurdles and complexities.

As previously mentioned, prior art urban maps are a very useful element in the generation of the above-described type of report for urban planning exercises. Prior art urban maps principally identify physical characteristics of transportation routes, and include identifiers like street names and station names on those maps. The maps may include indications as to whether a particular area is more dominated by residential, commercial or industrial activity, but little more. In general, such maps are very useful for navigating the urban region, but provide limited information when attempting to generate complex reports for urban planning.

More recent urban maps of the prior art offer information that can be used for more than simply navigating the urban region. These maps are generated at least in part, using remotely sensed data obtained from satellites, air-planes and the like. Baltsavias, Emmanuel P. and A. Gruen. "Resolution Convergence: A comparison of aerial photos. LIDAR and IKONOS for monitoring cities" in *Remotely Sensed Cities*, edited by Victor Mesev, Taylor & Francis, London, 2003 ("Baltsavias") is one prior art reference that discloses an example of such an urban map. Baltsavias includes a review and evaluation of the use of current high-resolution remote sensing technologies including aerial/digital orthoimagery, Laser-Induced Detection and Ranging ("LIDAR"), IKONOS (4-meters per pixel colour and 1 meter per pixel black-and-white optical satellite imagery) to extract geospatial information such as:

1) digital terrain models ("DTM", an elevation model that is a representation of the bare surface of the earth with natural and manmade features removed);
2) digital surface models ("DSM", also referred to as a "first surface" model in which man-made and natural features are captured in the elevation model); and,
3) an identification of urban objects such as buildings, roads, vegetation, etc, and reconstruction of three-dimensional urban objects such as buildings.

Baltsavias describes requirements for developing three-dimensional city models and briefly describes two commercial applications that have been developed, InJECT, a product of INPHO GmbH, Stuggart, Germany and CyberCity Modeler (CC-Modeler) marketed by CyberCity AG, Bellikon, Switzerland. Baltsavias describes a prototype system, CyberCity Spatial Information System ("CC-SIS") which is an attempt to integrate three dimensional city models with a relational database that can be potentially linked to external Geographic Information Systems ("GIS") data. In order to identify objects, the user manually identifies points onscreen, and only then will the application automatically build topology that includes the geometry needed to relate those points and identify an object. The application requires the use of digital orthophotos which are costly to acquire at the resolution that is necessary to build the city model. Further, Baltsavias does not explain how to derive building use or type and its relation to other buildings in its immediate proximity or at the city-wide scale. The application does not allow a user to assess how a region functions or compares to other urban regions. In general, Baltsavias is limited in how it offers to describe and visualize an urban region's composition and functions.

Another example of increased urban map sophistication is found in Barnsley, Michael J., A. M. Steel, and S. Barr. "Determining urban land use through an analysis of the spatial composition of buildings identified in LIDAR and multispectral image data," in Remotely Sensed Cities, edited by Victor Mesev. Taylor & Francis, London, 2003. ("Barnsley"). Barnsley uses a combination of IKONOS at 4 meters per pixel colour satellite imagery and LIDAR (2 m) image data at 0.4 point sampling density per square-meter, to extract the existence of building objects from other surrounding objects, such as trees or paved roads. The results of the extraction were compared to base data to gage accuracy of results. Four test areas are used where the predominant land use is either residential or industrial. Given the limitations of the data sets several thresholds were applied to the data to improve the results. Barnsley develops a graph-based pattern recognition system to infer land use by height and structural configuration. The technology and techniques used in Barnsley to extract building objects semi-automatically and to identify differences in morphological properties of buildings and the structural composition of built form patterns were successful in differentiating general land use types, (e.g. residential versus industrial), but there were problems in identifying and characterizing unique patterns within these general land use types, different residential and industrial patterns were not able to be characterized given the measurement techniques used. In general, Barnsley does not teach how to classify and describe the unique built form for different residential and industrial uses.

An example of an as-yet unfulfilled attempt to provide a more sophisticated urban map is found in Eguchi, Ronald, C. Huyck, B. Houshmand, D. Tralli, and M. Shinozuka. "A New Application of Building Inventories using Synthetic Aperture Radar Technology.", presented at the 2nd Multi-Lateral Workshop on Development of Earthquake and Tsunami Disasters Mitigation Technologies and their Integration for the Asia-Pacific region. Mar. 1-2, 2000. Kobe, Japan. ("Eguchi"). Using Interferometric Synthetic Aperture Radar (IF-SAR) airborne technology, aerial photography and county tax assessment data, Eguchi attempts to identify building types based on building footprint and height which they extract from the remotely sensed data and validate results using county tax assessment data. The preliminary results of the techniques used and future research plans are presented in Eguchi, laying the groundwork to work towards a building inventory at a citywide scale from which they can measure building density and development. Despite the groundwork that has been laid, there is no indication of success or how such success will be achieved.

Another example is Mesev, Victor. "Urban Land Use Reconstruction: Image Pattern Recognition from Address Point Information.", presented at the International Archives of Photogrammetry, Remote Sensing and Spatial Information Sciences Conference, Regensburg, Germany, 27-29 Jun. 2003. ("Mesev"). Mesev examines the use of address point data collected by the Ordnance Survey in the UK to examine spatial patterns of development in Bristol UK. The address point data contains information on general land use types, residential versus commercial, and Mesev attempts to identify differences between different areas of the same land use type, e.g. residential #1 and residential #2, based on a various spatial indices/techniques, i.e. density of points and nearest neighborhood analysis. This information from this spatial recognition system is used to inform multispectral image classifications of urban regions. Mesev introduces some preliminary results used on fine resolution aerial photography provided by a company called Cities Revealed (The Geoinformation Group, Telford House, Fulbourn, Cambridge, CB1 5HB, United Kingdom —http://www.crworld.co.uk). The remote sensed imagery for Cities Revealed is quite costly to acquire for a large urban region. The data used for the pattern recognition is unique to the UK but not available for all regions, since the UK can rely so heavily on the UK Ordnance Survey. Likewise the spatial indices are not fully successful on other urban land use classes such as commercial and industrial where information on building characteristics would be more useful than just the arrangement of buildings.

SUMMARY OF THE INVENTION

It is an object of the present invention to provide a novel method and system for mapping that obviates or mitigates at least one of the above-identified disadvantages of the prior art.

An aspect of the invention provides a map of an urban region comprising a first set of indicia representing physiographic characteristics of said region and a second set of indicia representing a plurality of different types of built forms, and their locations, that are located within said region. The map also includes a third set of indicia representing patterns of human activity associated with both said physiographic characteristics and said built forms.

Another aspect of the invention provides an apparatus that includes remote sensing equipment that is connected to a computer processor. The remote sensing equipment gathers imaging data about an urban region. The computer processor interprets the imaging data to generate a map of the urban region comprising representations that identify a first set of indicia representing physiographic characteristics, a second set of indicia representing different types of built forms, and a third set of indicia representing patterns of human activity associated with both the physiographic characteristics and the built forms. The map can also include a fourth set of indicia representing an intensity level that at least one of the other types of indicia occurs.

BRIEF DESCRIPTION OF THE DRAWINGS

The present invention will now be explained, by way of example only, with reference to certain embodiments and the attached Figures in which.

DESCRIPTION OF THE INVENTION

Figure 1:
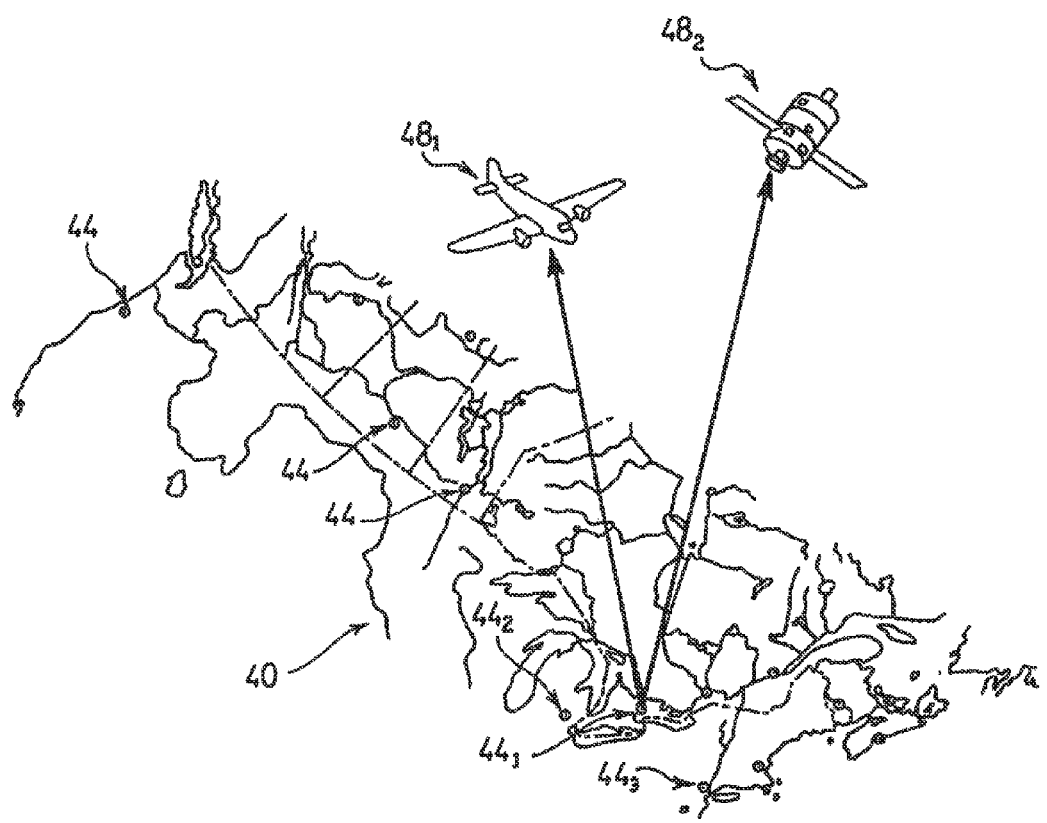
FIG. 1 is a representation of a section of a geographic territory containing a number of urban regions.

FIG. 1 shows a territory 40 containing a plurality of urban regions 44. In the example in FIG. 1, territory 40 is a section of North America roughly bisected by the US-Canada border, but it is to be understood that this is merely an example of a territory to which the teachings herein can apply. Thus, the urban regions 44 in territory 40 include various well-known urban regions, including Toronto, indicated at $44_1$, Detroit indicated at $44_2$, and New York at $44_3$—other areas are simply indicated by the reference 44. It should be understood that, in a present embodiment, area 44 is not intended in its political sense, but rather to indicate urban regions in a geographic sense. Thus, an area like Toronto $44_1$ refers to the Greater Toronto Area, or the entire "Golden Horseshoe", spanning the municipalities from Hamilton to Bowmanville along the north shore of Lake Ontario. In like fashion, Detroit $44_2$, and New York $44_3$ refer to their respective greater metropolitan areas.

FIG. 1 also shows two remote sensing devices 48, namely an airplane $48_1$ and a satellite $48_2$ passing over territory 40. Devices 48 include imaging equipment to enable device 48 to be operable to remotely sense data associated with urban regions 44, according to a desired and appropriate remote sensing modality such as aerial photography, aerial/digital orthoimagery, LIDAR., IKONOS, RADAR. Other types of devices 48, and modalities respective thereto, will occur to those of skill in the art.

Figure 2:
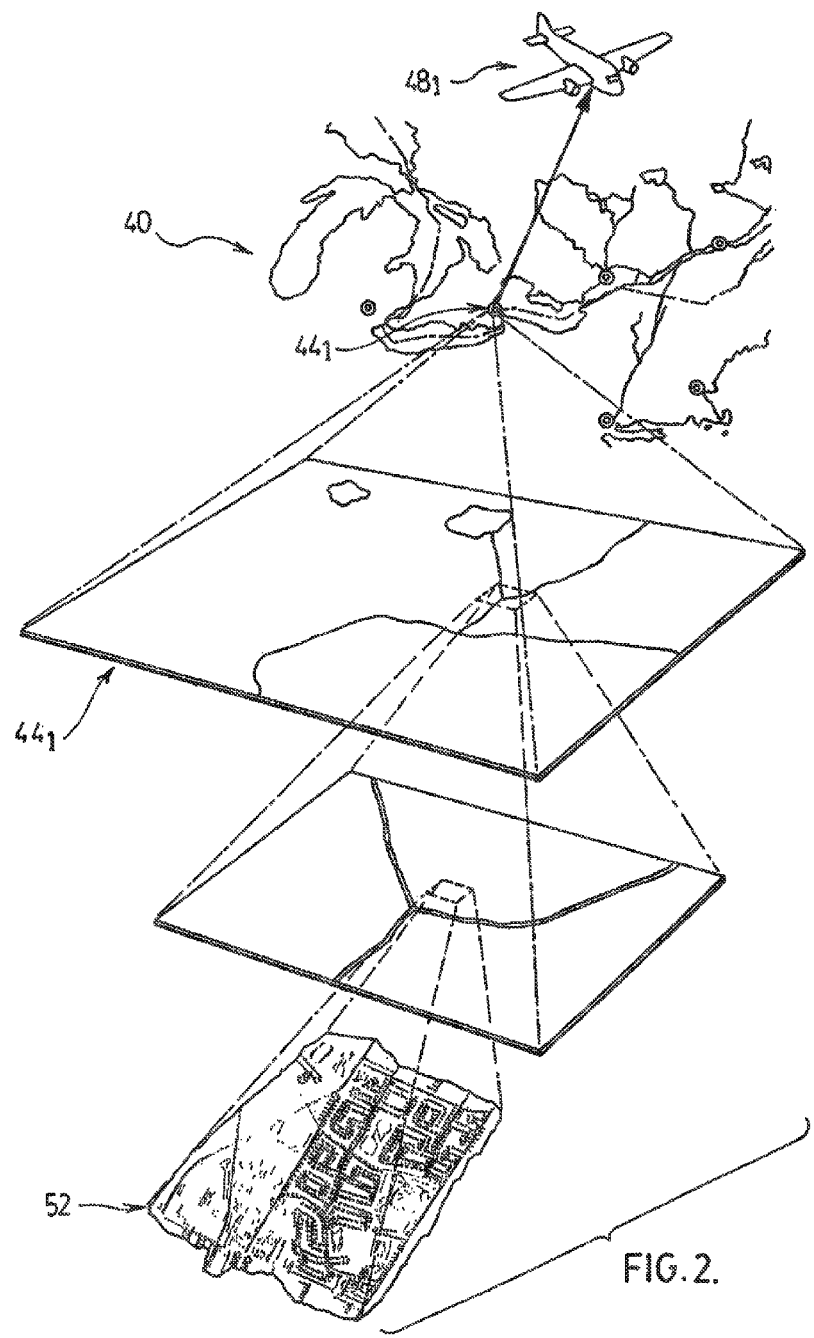
FIG. 2 is a representation of an area within an urban region in the territory of FIG. 1 being remotely sensed.

FIG. 2 shows device 48 (i.e. airplane $48_1$) remotely sensing data respective to a particular area 52 within a region 44 (i.e. Toronto $44_1$). In general, device 48 is operable to sense data associated with a plurality of areas within a particular region 44, thereby remotely sensing data that comprises the entire region 44. Thus, it is to be understood that area 52 is shown as an example for purposes of explaining various embodiments of the invention.

Figure 3:
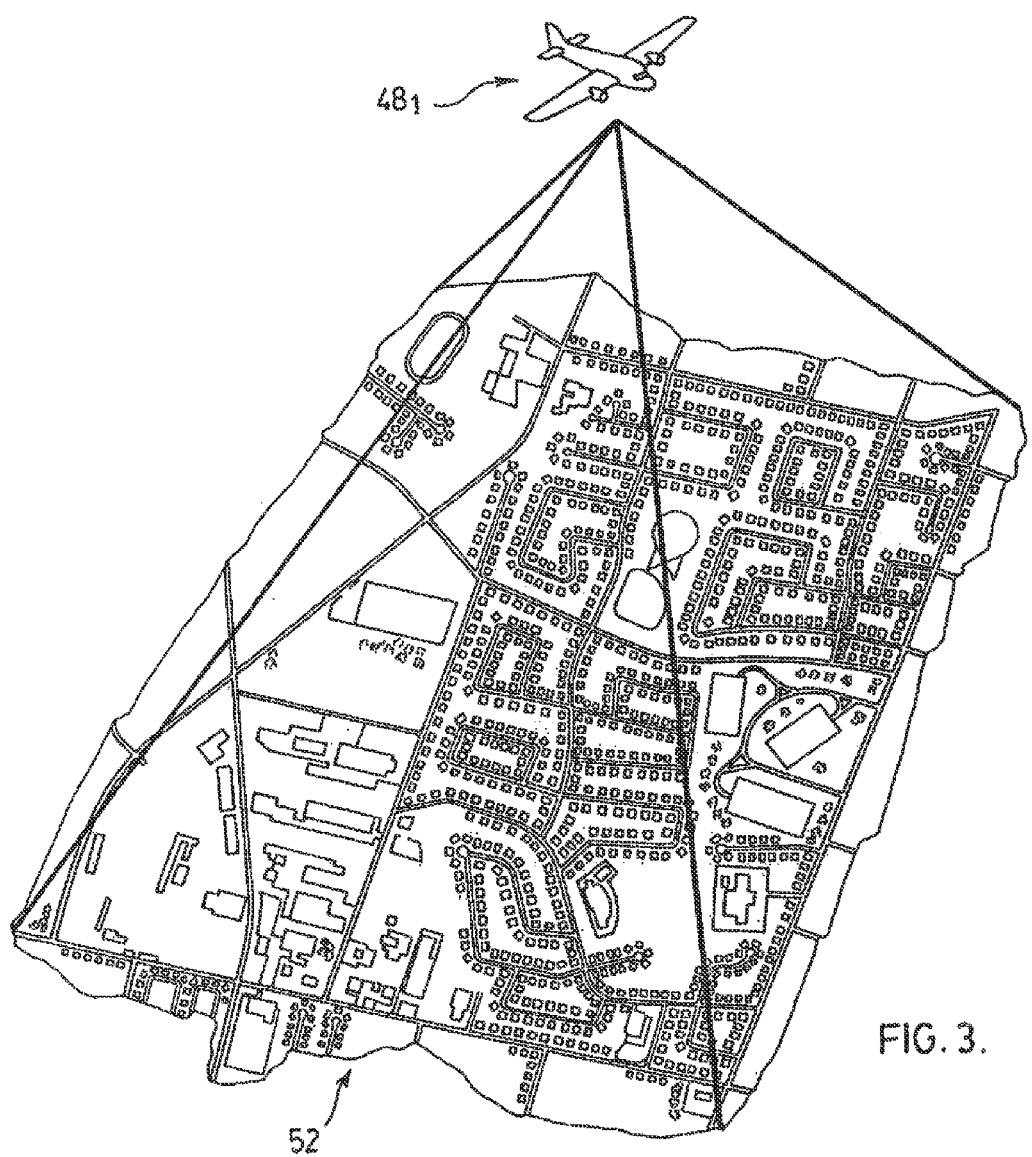
FIG. 3 is a representation of the remote sensing being performed in FIG. 2 in greater detail.

FIG. 3 shows area 52 in greater detail, and in a present embodiment, area 52 is sensed by device 48 as a photograph. Area 52 (and/or portions thereof and/or other portions of region 44) can be characterized in terms of a number of indicia, including physiographic forms, built forms, activity patterns, and use intensity, and various degrees thereof. Physiographic forms includes the natural physical features of area 52, including landscape and physical objects such as terrain, trees, rivers, and streams. More specific terms ways of describing physiographic forms can be found in Anderson, James R., E. E. Hardy, J. T. Roach, and R. E. Witmer, 1976. "A Land Use And Land Cover Classification System For Use With Remote Sensor Data." Geological Survey Professional Paper 964, the contents of which are incorporated herein by reference. In contrast, built forms include anything artificially constructed upon the physiographic forms, such as roads, houses, buildings, parks, parking lots, monuments, etc. (Table I, hereinbelow, provides a detailed list of potential built form types.) Activity patterns include the nature of the human activity/activities occurring within area 52, and can include information about employment, residency, recreation, industry, commerce and/or combinations thereof. Finally, use intensity is a metric identifying the extent or amount of a particular activity is occurring. Intensity can also include the degree of a particular activity, or mix of activities, in order to describe the possibility of a varying range to the activity indicium of the classification scheme. Further details about these indicia will be discussed in greater detail below.

Figure 4:
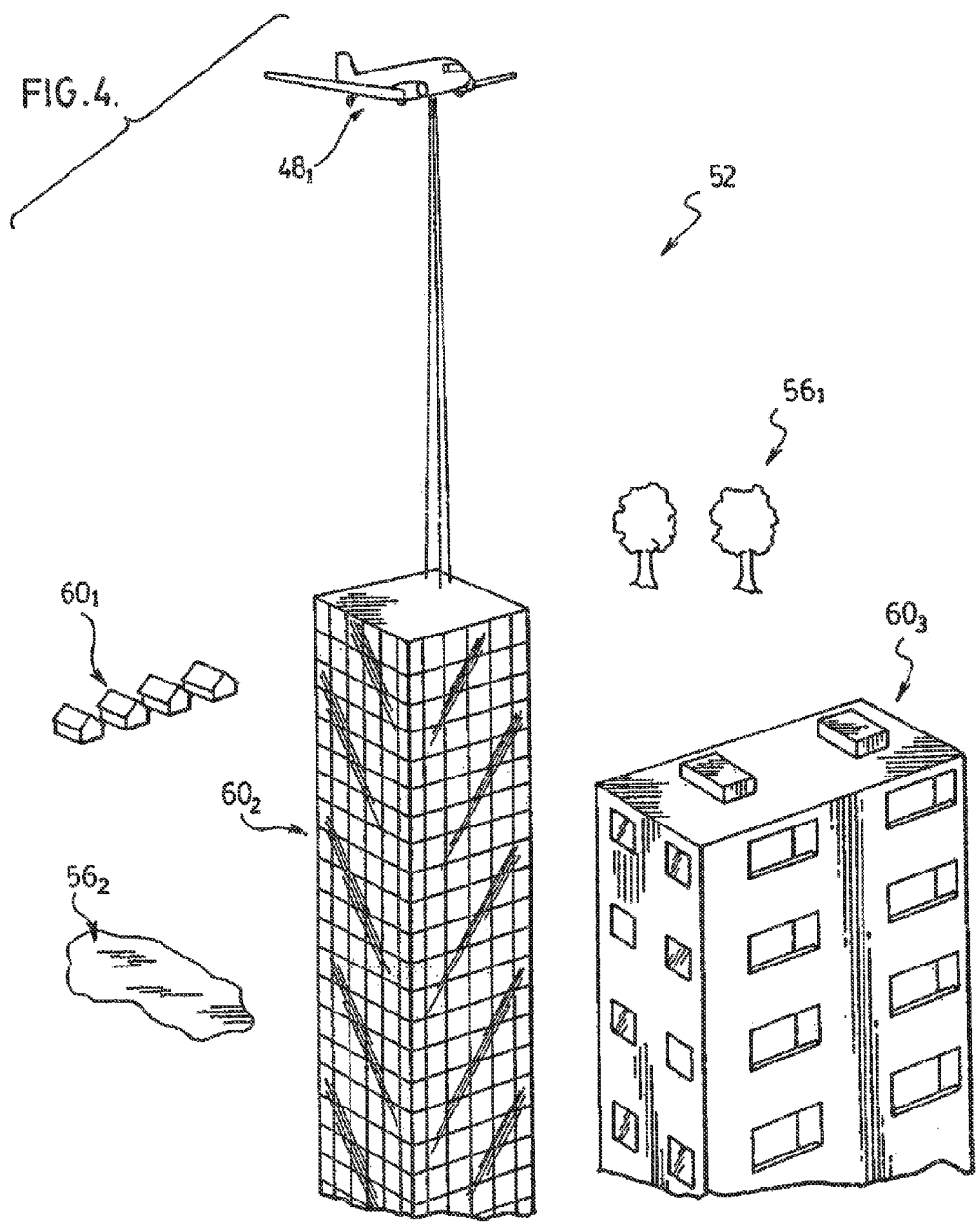
FIG. 4 is a representation of the remote sensing being performed in FIG. 3 in greater detail.

FIG. 4 shows a small portion of area 52 in further detail, with device 48 passing over, and sensing physiographic forms 56, in the form of trees $56_1$ and a stream $56_2$, and built forms 60, in the form of houses $60_1$, an office tower $60_2$, and an apartment building $60_3$.

Figure 5:
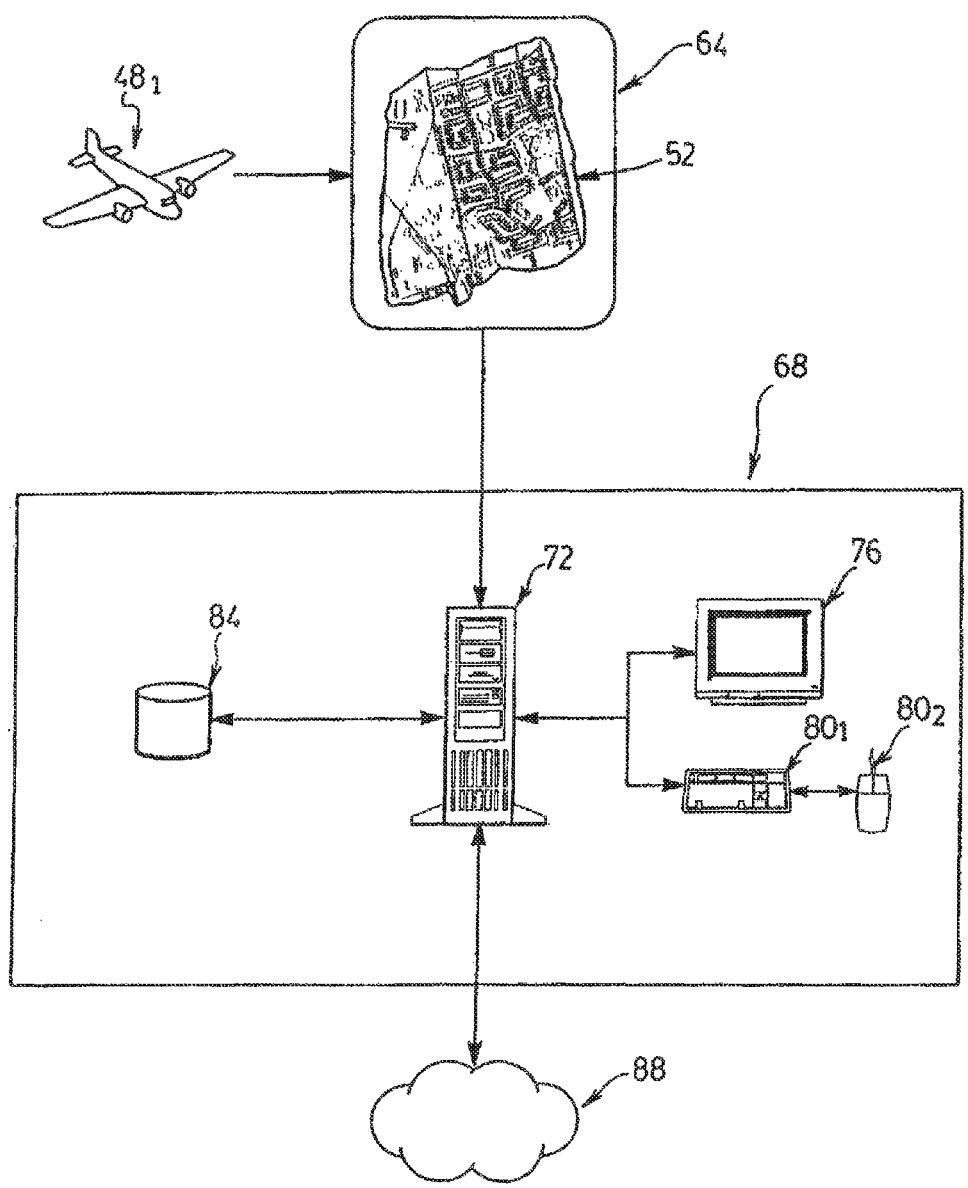
FIG. 5 is a representation of the data sensed in FIGS. 2-4 being inputted into an apparatus for generating a map in accordance with an embodiment of the invention.

FIG. 5 shows the transfer of data 64 sensed by device 48 that includes a photograph of area 52 being transferred from device 48 to an apparatus 68 for mapping in accordance with an embodiment of the invention. Apparatus 68 is generally operable to interpret data 64 to generate a map of area 52 that is based on, at least in part, some or all of the above-identified indicia. In the present embodiment, apparatus 68 is a server, but can be a desktop computer, client, terminal, personal digital assistant or any other computing device. Apparatus 68 comprises a tower 72, connected to an output device 76 for presenting output to a user and one or more input devices 80 for receiving input from a user. In the present embodiment, output device 76 is a monitor, and input devices 80 include a keyboard $80_1$ and a mouse $80_2$. Other output devices and input devices will occur to those of skill in the art. Tower 72 is also connected to a storage device 84, such as a hard-disc drive or redundant array of inexpensive discs ("RAID"), which contains reference data for use in interpreting data 64, further details of which will be provided below. Tower 72 typically houses at least one central processing unit ("CPU") coupled to random access memory via a bus. In the present embodiment, tower 72 also includes a network interface card and connects to a network 88, which can be the intranet, internet or any other type of network for interconnecting a plurality of computers, as desired. Apparatus 68 can output maps generated by apparatus 68 to network 88 and/or apparatus 68 can receive data, in addition to data 64, to be used to generate a map of area 52 that is based on, at least in part, some or all of the above-identified indicia.

Figure 6:
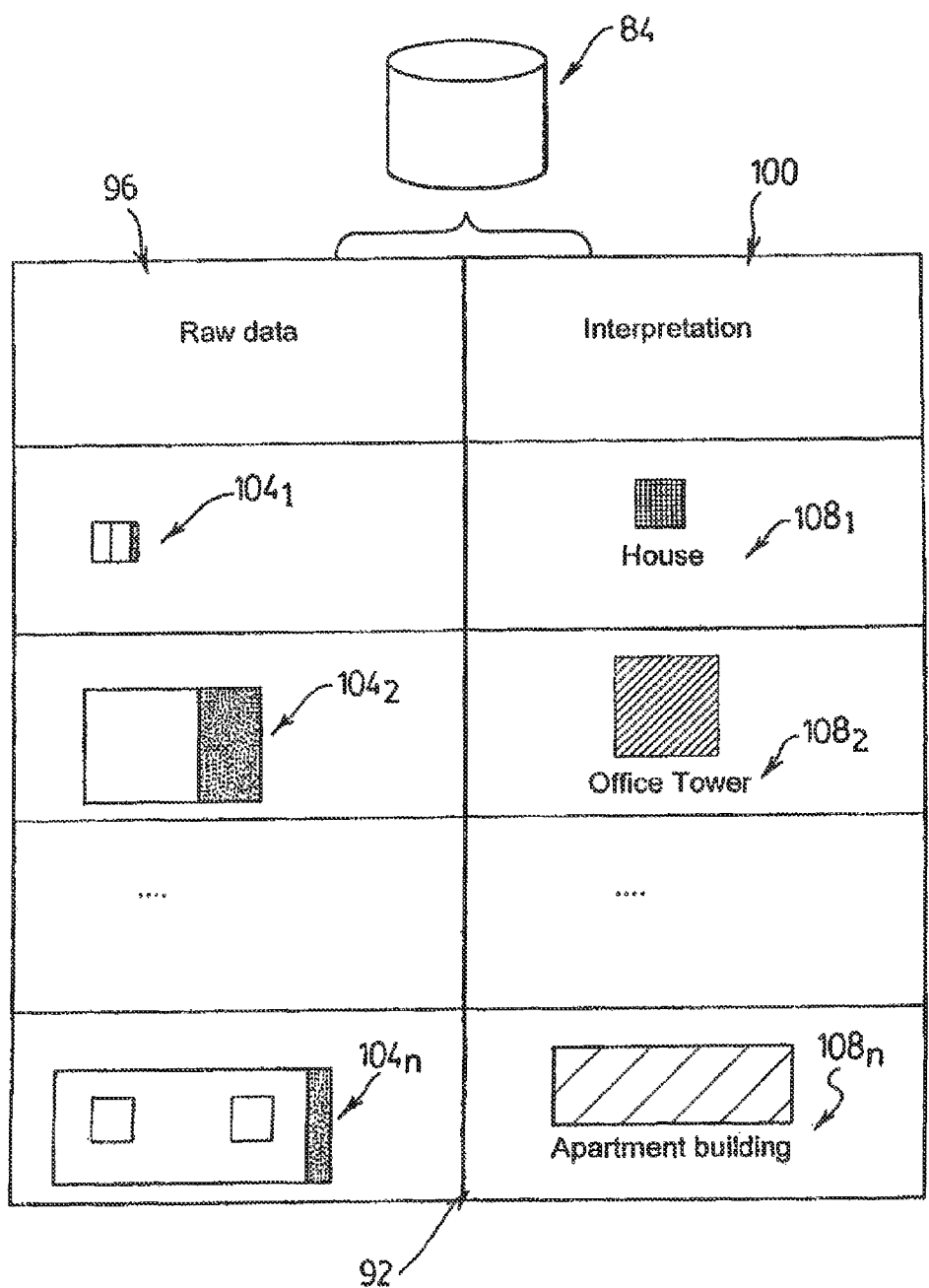
FIG. 6 is a representation of a database stored in the storage device in FIG. 5 that can be used to interpret raw data sensed in FIGS. 2-4.

FIG. 6 shows a simplified representation of the kind of databases and tables that can be stored on storage device 84 to assist the CPU in tower 72 with the interpretation of data 64. In FIG. 6, storage device 84 stores a two-dimensional table 92. Table 92 includes built form data, comprised of a left column 96, labelled "Raw Data", and a right column 100, labelled "interpretation". Thus, each record in table 92 includes, in left column 96, an object 104 corresponding to raw data that may be found in remotely sensed data 64, and in right column 100, an object 108 identifying a corresponding interpretation of object 104. More specifically, object $104_1$ corresponds to a house, object $104_2$ corresponds to an office tower, and object $104_n$ corresponds to an apartment building.

Figure 7:
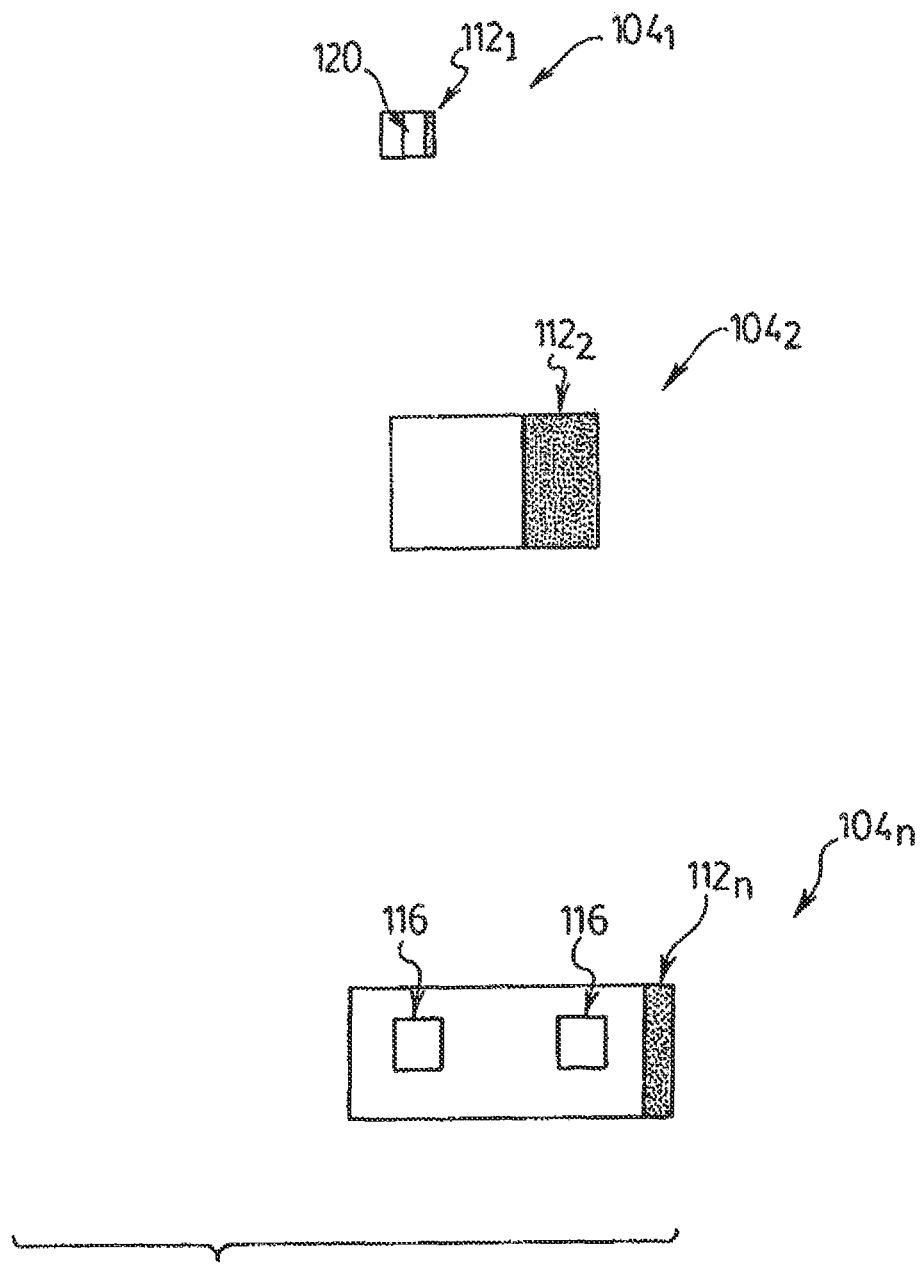
FIG. 7 shows the objects in the database in FIG. 6 in greater detail.

It is expected that the raw data found in data 64 will include a number artifacts and other unique identifiers, and table 92 will include information about such identifiers to provide CPU in tower 72 with additional information to use when distinguishing between various types of built forms found in data 64. FIG. 7 shows objects 104 in greater detail, to provide examples of the kinds of identifiers that can be associated with each object in table 92. For example, it is to be noted that each object 104 includes a shadow 112. Note that shadow $112_2$ is the longest, shadow $112_n$ is shorter than shadow $112_2$ and shadow $112_1$ is shorter than shadow $112_n$. Such shadow length as found in data 64 can be used to infer the height of a given object 104, and therefore can assist CPU in tower 72 with inferring the type of built form that is associated with a given object found in data 64. By determining relative heights of objects in data 64, the CPU in tower 72 can make relative decisions about the appropriate interpretation to be given to a particular object 104. In this example, a shadow 112 is used to determine the height of a given object, but it should be understood that more sophisticated means can be used to infer height—such as through the use of LIDAR. Thus, when data 64 is collected, it can be desired to use a combination of sensing modalities, i.e. photography and LIDAR, and to combine that sensed data to derive even further information and identification about objects in area 52.

It should now be understood that a variety of different identifiers can be used in computing operations performed by the CPU in tower 72 to further assist in the distinguishing of various built forms found in area 52. For example, the presence of two squares 116 on each end of object $104_n$ are indicative of the presence of elevator shafts, and the rectangular shape of object $104_n$, in combination with the presence of the elevator shafts and its shorter height than object $104_2$ can be used to determine that object $104_n$ is an apartment building. As an additional example, object $104_1$ includes a peak line 120 of its roof, as further indication that object $104_1$ is a house.

As another example of an identifier, close groupings of elements in data 64 that resemble objects $104_1$ can be used as a further indicator that such an element is in fact a house $60_1$. As still a further example of an identifier, large open spaces detected around a given element found in data 64 can be indicative of parking lots, thereby eliminating the likelihood that a given element in data 64 is actually a house $60_1$.

As an additional identifier, in certain geographic regions, particularly in North America, there is a limited number of built form types that recur. Due to this limited number, probability formulations can be used, in addition to the identifiers such as the identifiers listed above (or such other identifiers as may be determined to be useful from time to time), to improve the likelihood of an accurate determination of a particular built form type. Table I shows a list of such built form types and identifiers that can accompany each type that can be used in databases on storage device 84 (such as table 92) and in conjunction with software executing on tower 72 to actually distinguish certain built form types from others.

TABLE I

Built form types

| Built Form Type | Description And Identifiers | Activity Type (Inferred From Built Form Identification) |
| --- | --- | --- |
| Detached House | Single family dwelling, commonly found in suburban districts (residential neighbourhoods). | Residential |
| Semi-Detached House | One to four storeys, each a discreet building on a fenced parcel. Usually ridge-roofed | Residential |
| Row House Or Town House | As above, but with one wall, shared with another house. | Residential |
| Mid-rise Apartment Building | A building consisting of joined single family dwellings, as above. One to four storeys with shared walls. | Residential |
| High-Rise Apartment Building | Multiple family apartment building of five to eight floors, often located (in north america) along main streets, normally with an elevator core and predictable dimensions. | Residential |
| Low To Mid-Rise Office Building | Free-standing buildings of 2 to 8 storeys, most commonly in suburban locations and main streets. Distinguished usually by entrance and surface parking patterns around them. | Office/ Administration |
| High-Rise Office Tower | Free-standing building of 8 or more storeys, identified particularly by plate dimensions and shape. | Office/ Administration |
| Main Street Shop Building | 2 to 4 storey buildings with party walls, characterized by relatively narrow street frontages, composing shopping streets. | Retail |
| Strip Mall | Single-storey buildings arranged along or around surface parking lots. | Retail |
| Shopping Mall | A building composed of larger and smaller elements (department stores and shops, surrounded by surface parking and with specific track loading patterns. | Retail |
| Big Box Store | Free-standing retail store of characteristic dimensions, with surface parking adjacent. | Retail |
| Factory | Large-plate, deep-space building of one or two storeys, with characteristic truck access and loading patterns. | Manufacturing |

TABLE I-continued

Built form types

| Built Form Type | Description And Identifiers | Activity Type (Inferred From Built Form Identification) |
|---|---|---|
| Road/Highway | Long, continuous pathway that separates other discrete built form types. | Transportation |
| Railway | Long, continuous pathway that separates other discrete built form types. | Transportation |

Thus, once tower 72 receives data 64, it can perform a progressive scan (or other suitable analytical technique) thereof, parsing elements found in the data 64 representing area 52, and compare those parsed elements with the information in table 92, particularly, the raw data left column 86 to ultimately identify the type of built form at that particular location in area 52. More particularly, once data 64 is parsed and objects therein are isolated, CPU in tower 72 can detect the presence and location of houses $60_1$, office towers $60_2$ and apartment building $60_3$. In general, those of skill in the art will recognize that the tasks being performed by CPU in tower 72 can be based on known techniques found in commercially available software that are currently applied to determining types of terrain and modeling of buildings. See for example http://www.tec.army.mil/TD/tvd/survey/index.html of the US Army Corps of Engineers. Those of skill in the art will now understand that such known techniques provide operations and software procedures for recognizing the presence, and showing the configuration of various physiographic forms and built forms, but are not generally suitable, in their current form, to perform the task of identifying different types of built forms. (i.e. In the military context, the purpose of gathering such information is for gaining battlefield advantage to invade or defend an urban region, and not for the purpose of planning improvements to the region.)

Figure 8:
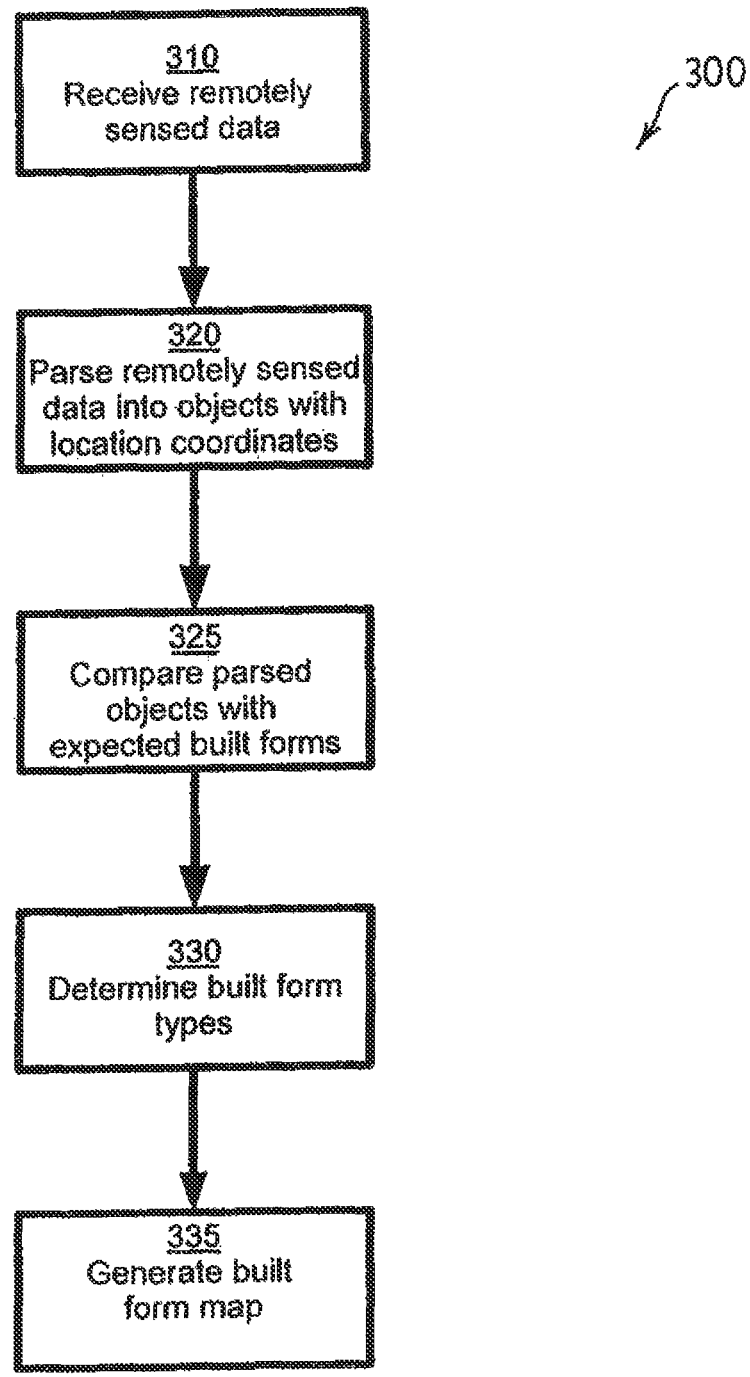
FIG. 8 is a flowchart depicting a method of generating a map in accordance with an embodiment of the invention.

Referring now to FIG. 8, a method for generating a map is indicated generally at 300. In order to assist in the explanation of the method, it will be assumed that method 300 is operated using apparatus 68 and the above-described aspects relating thereto. Furthermore, the following discussion of method 300 lead to further understanding of apparatus 68. (However, it is to be understood that apparatus 68 and/or method 300 can be varied, and need not work exactly as discussed herein in conjunction with each other, and that such variations are within the scope of the present invention.)

Beginning first at step 310, remotely sensed data of an urban region is received. This step is essentially performed as previously described, with remote sensing device 48 passing over a given urban region 44 and, with its imaging technology activated, the device 48 gathers data, such as data 64, of a particular region 44. The data 64 is then transferred to tower 72 of apparatus 68 using appropriate network interfaces— such as via wireless directly from the device 48, or by means of a physical media that is removed from device 48 and inserted into a reading device on tower 72, or by any other means as desired.

Figure 9:
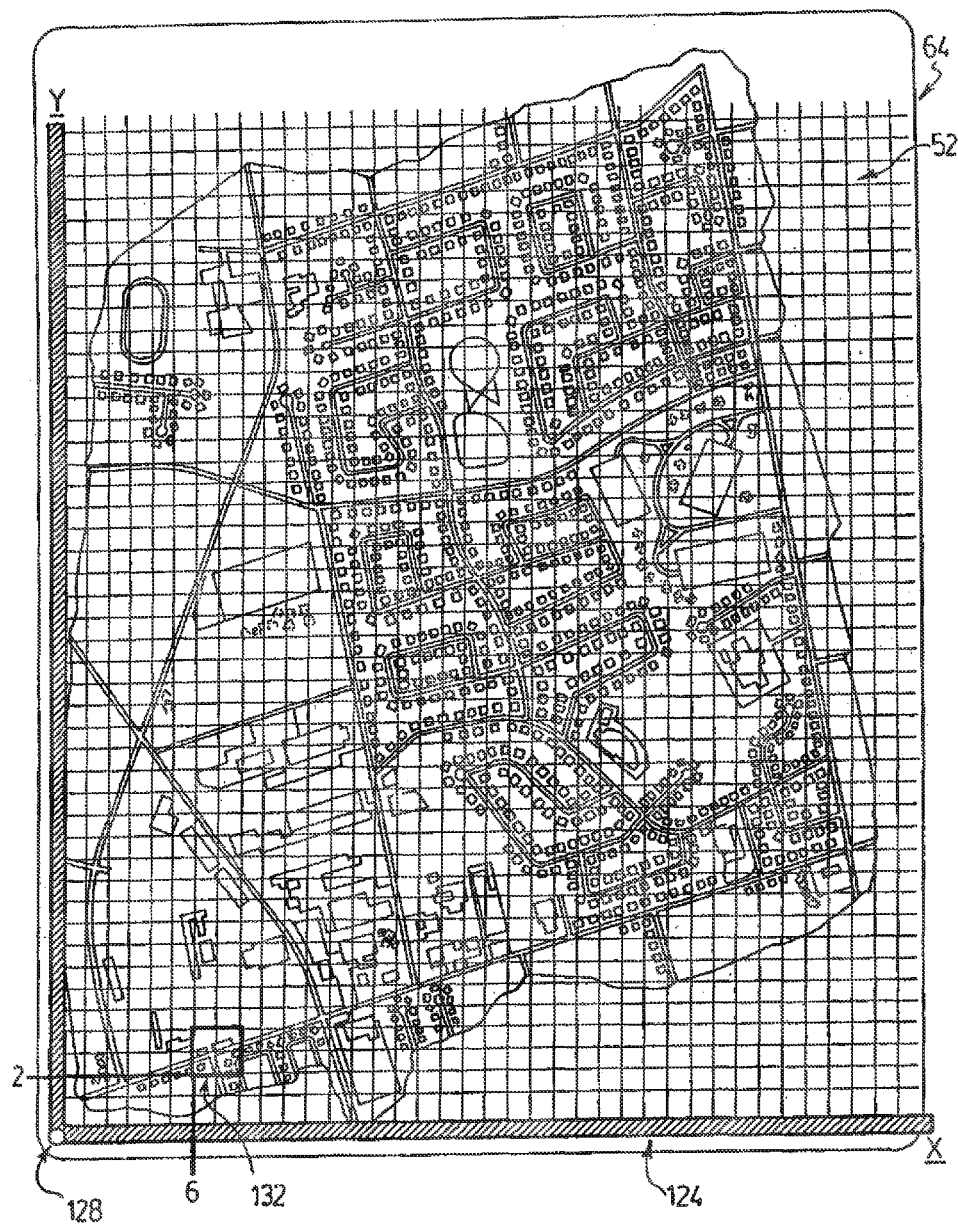
FIG. 9 shows sensed data representing an area within a region that is being parsed in accordance with a performance of the method in FIG. 8.

Next, at step 320, the remotely sensed data is parsed into objects with location coordinates. This step can be done according to any known or desired technique of analyzing data 64 to extract individual objects, and assign coordinates thereto, as will occur to those of skill in the art. For example, FIG. 9 shows area 52 in data 64 being divided into a logical grid 124, with an (X,Y) coordinate system, and with an origin 128 at the coordinates (0,0). FIG. 9 also shows four squares in grid 124 highlighted as block 132. Block 132 begins at coordinate (6, 2) on grid 124. To help further explain method 300, block 132 will be discussed in greater detail as an example of how method 300 can process data 64.

Figure 10:
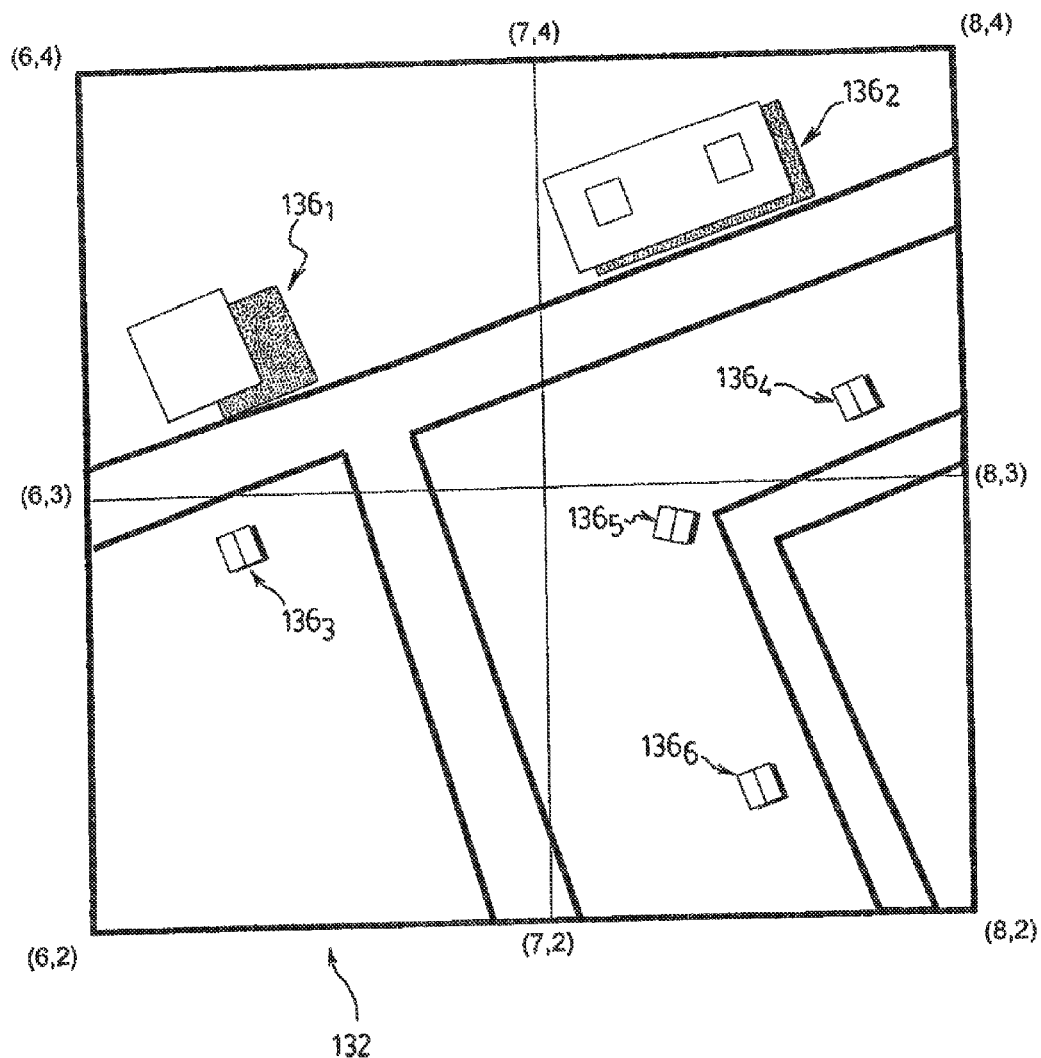
FIG. 10 shows a small block within the area shown in FIG. 9.

FIG. 10 shows block 132 of data 64 in greater detail. Thus, when step 320 is performed on block 132, image processing performed on that block 132 leads to the identification of objects $136_1$, $136_2$, $136_3$ ... $136_6$ as labelled on FIG. 10. Note that, the manner in which objects $136_1$, $136_2$, $136_3$ ... $136_6$ are shown in block 132 is to be representative of the appearance of objects $136_1$, $136_2$, $136_3$ ... $136_6$ of such objects as raw collected data by device 48, as packaged within data 64. Thus objects $136_1$, $136_2$, $136_3$ ... $136_6$ include a number of artifacts and other identifiers, but objects $136_1$, $136_2$, $136_3$ ... $136_6$ are otherwise currently unidentified. Thus, also when step 320 is performed on block 132, a database is created that lists those objects and their locations. Table II shows a list of location coordinates that would be created during the performance of step 320 on block 132.

TABLE II

Objects and locations in Block 132

| Object Number | Location Coordinates (X, Y) |
|---|---|
| Object $136_1$ | (6.3, 3.3) |
| Object $136_2$ | (7.1, 3.6) |
| Object $136_3$ | (6.4, 2.8) |
| Object $136_4$ | (7.7, 3.2) |
| Object $136_5$ | (7.3, 2.9) |
| Object $136_6$ | (7.5, 2.3) |

Referring again FIG. 8, method 300 advances from step 320 to step 325, at which point the objects parsed at step 320 are compared with a set of expected built forms. Thus, having identified objects $136_1$, $136_2$, $136_3$ ... $136_6$, each one is then compared with an expected set of built forms stored in device 84, and in particular, in table 92. Using table 92 and the aforementioned interpretation techniques (or such other interpretation techniques as may be desired), an interpretation of the raw data associated with each object 136 can be obtained. During such a comparison, it will be determined that object $136_1$ resembles object $104_2$; objects $136_2$ resembles object $104_n$; and objects $136_3$, $136_4$, $136_5$ and $136_6$ resemble object $104_1$.

At step 330, the type of built forms of each object is determined. Thus, using the results of the comparison at step 325, tower 72 makes a determination as to the identity of each of the objects 136 identified at step 320, and adds to the information in Table II to produce a new table, of the form of Table III, that includes the built form type of that particular object.

TABLE III

Built form type of each object in block 132

| Object Number | Location Coordinates (X, Y) | Built form Type |
|---|---|---|
| Object $136_1$ | (6.3, 3.3) | Office Tower |
| Object $136_2$ | (7.1, 3.6) | Apartment Building |
| Object $136_3$ | (6.4, 2.8) | House |
| Object $136_4$ | (7.7, 3.2) | House |
| Object $136_5$ | (7.3, 2.9) | House |
| Object $136_6$ | (7.5, 2.3) | House |

Figure 11:
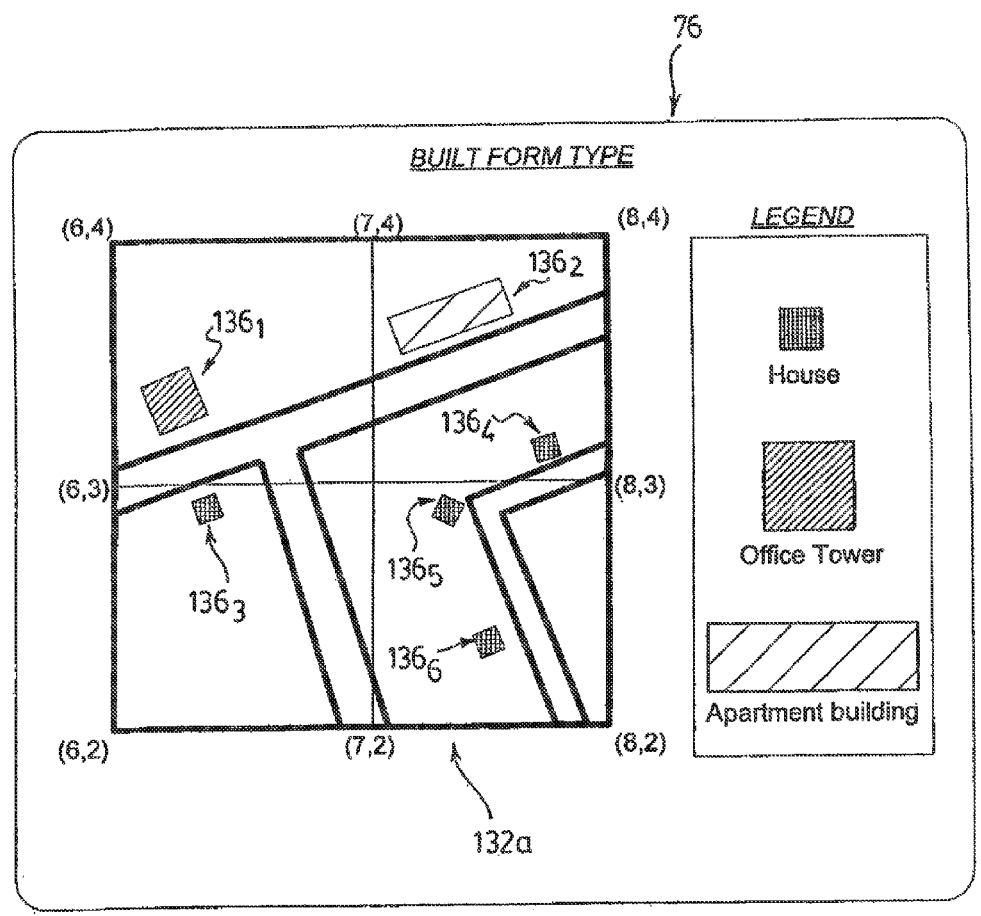
FIG. 11 shows a map of the block in FIG. 10 that was generated using the method of FIG. 8.

At step 335, a built form map is generated based on the results of the performance of steps 320-330. Thus, tower 72 uses the information in Table III to redraw block 132. As shown in FIG. 11, tower 72 thereby generates block 132a from block 132 and Table III, and outputs block 132a onto output device 76. (It should be understood that block 132a can also be saved on storage device 84, or sent to another computing device on network 88, or output in other ways.) Block 132a thus represents the built forms in area 52 in iconographic form, and provides a legend as to the built form type of each icon present in block 132a. In a similar manner, tower 72 can thus present all of area 52, and/or all of region 44 on display 76. In a present embodiment, it is contemplated that a full range of navigational tools are provided, to allow a user to use input devices 80 to move around area 52 (or region 44), and to zoom in or zoom out as desired.

Figure 12:
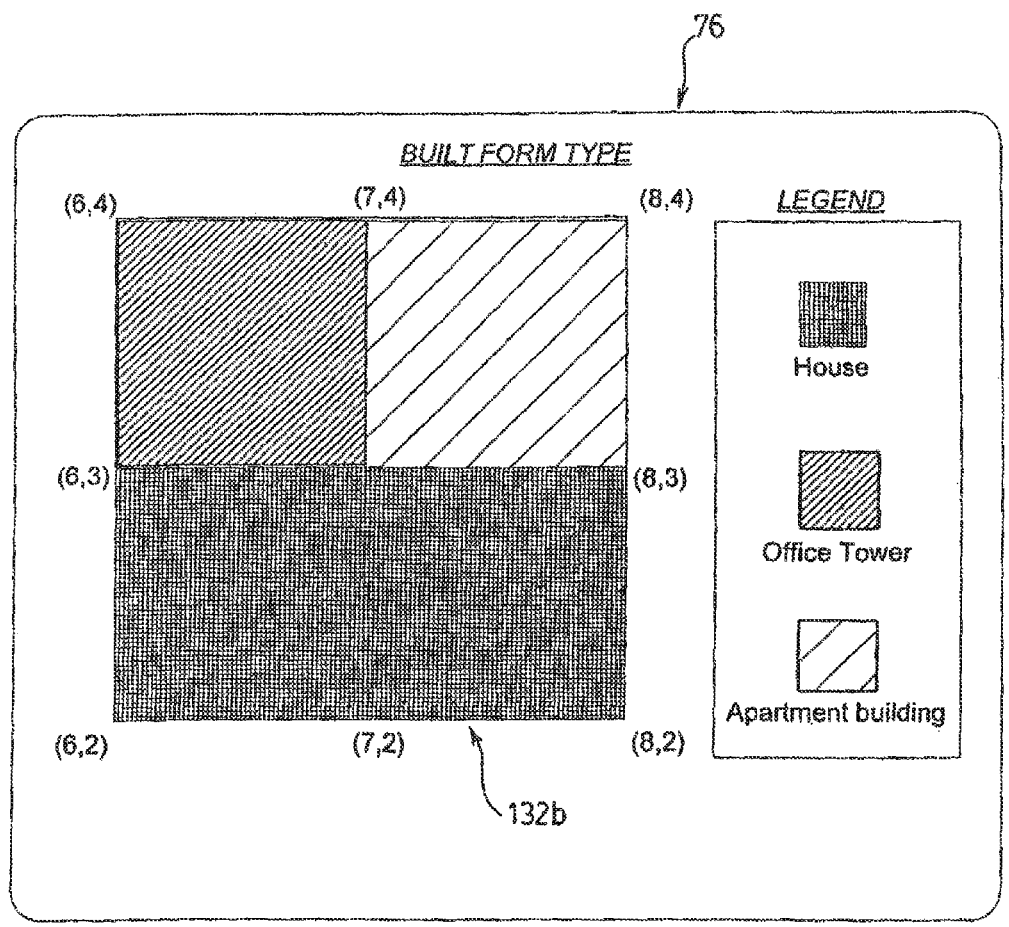
FIG. 12 shows the map of FIG. 11, generated using a variation on the method of FIG. 8 to produce a different map format.

As additional step to step 335, or as a variation to step 335, block 132 can be generated in the form shown in FIG. 12, indicated as block 132b, wherein a particular square bounded by a set of coordinates on grid 124 is marked in accordance with the most prevalent type of building form found within that particular square.

Figure 13:
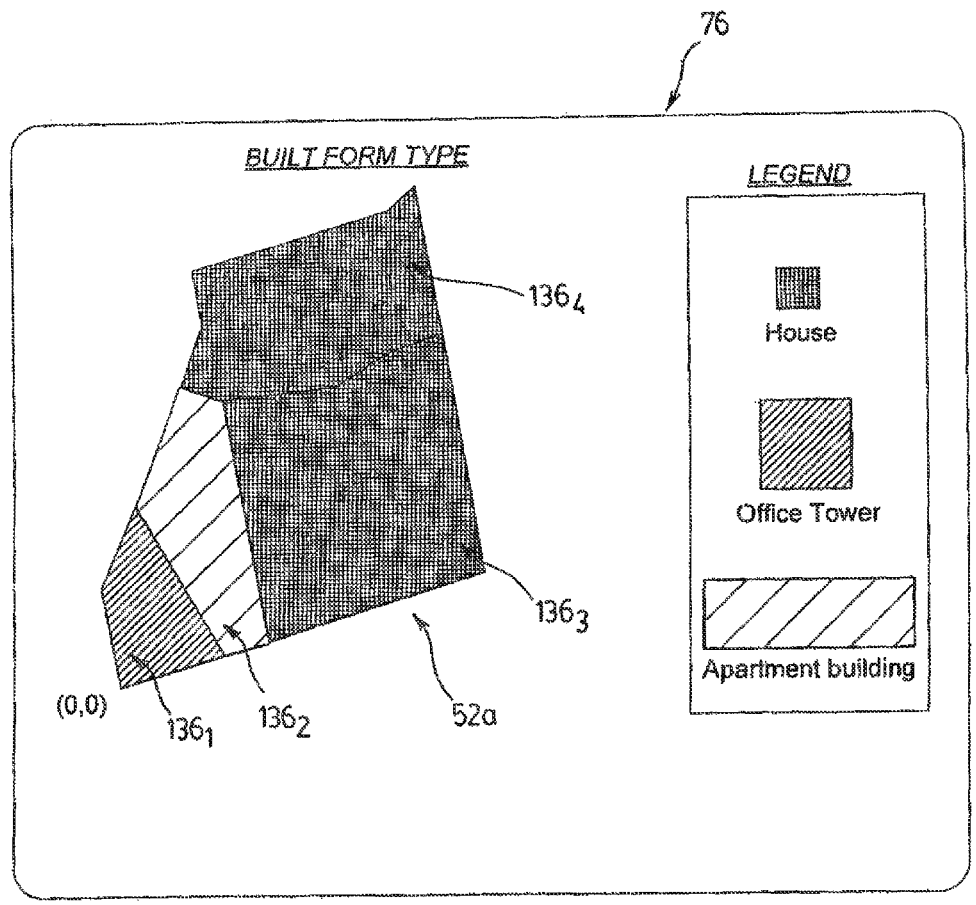
FIG. 13 shows a map in the same format as the map of FIG. 12, wherein the map shows the area in FIG. 9.
Figure 14:
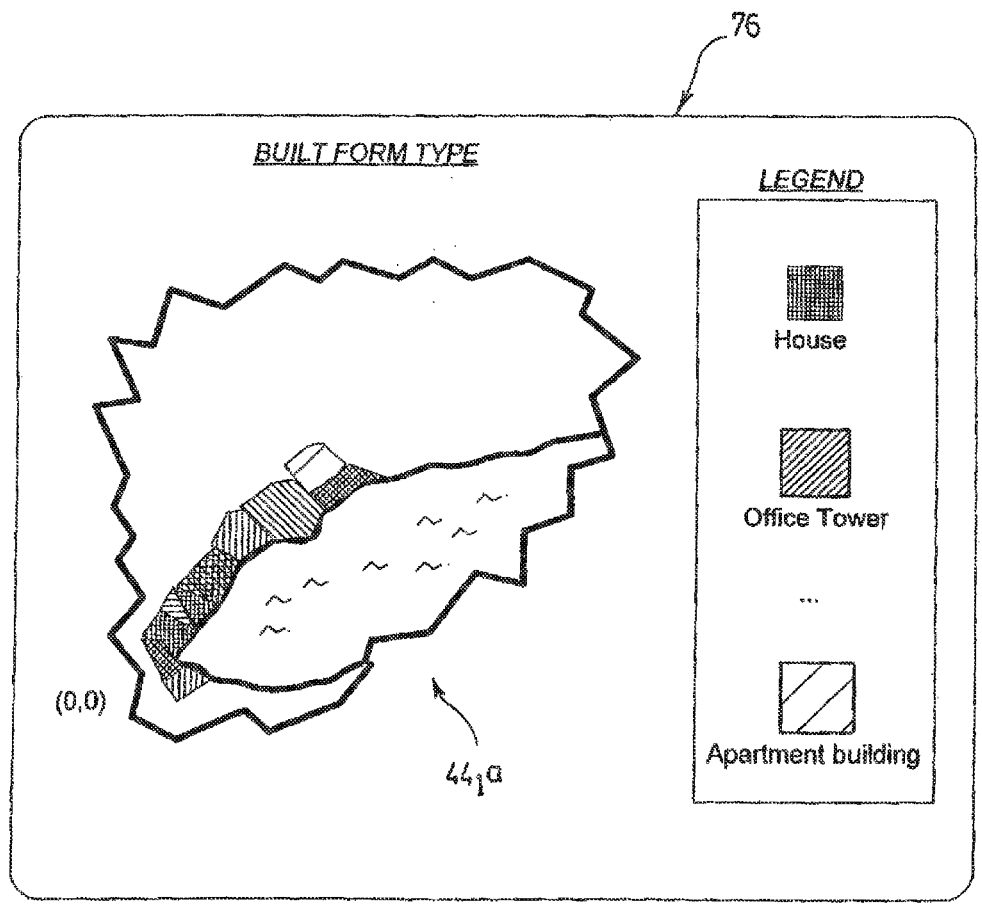
FIG. 14 shows a map of the same format as the map of FIG. 13 expanded to the regional level.

The methodology used to generate the map in FIG. 12 can also be applied to generation of maps of area 52 (in the form shown in FIG. 13 as area 52a) and/or the entirety of region 44 (in the form shown in FIG. 14 as region $44_1$a. In FIG. 13, area 52 has been rendered on output device 76 into area 52a, and is divided into four precincts $136_1$, $136_2$, ... $136_4$. Each precinct 136 is shaded according to the type of built form that is predominant in that precinct 136. Thus, precinct $136_1$, is shown to consist predominantly of office towers $60_2$; precinct $136_2$ is shown to consist predominantly of apartment buildings $60_3$; while precincts $136_3$, and $136_4$ are shown to consist predominantly of houses $60_1$. It is to be understood that other built form precinct types can be included, such as hybrids of office towers $60_2$ and houses $60_1$, where a given precinct consists of more than one predominant type of built form. It is also to be understood that the criteria used to determine where one precinct 136 begins, and another ends, is not particularly limited, and can be based on any number of factors such as user selection, political boundaries, physiography, transportation routes, combinations thereof; and/or can be based on more "fuzzy" types of logic where tower 72 is configured to create precincts according to groupings of squares in area 52 that are characterized by a predominance of a particular built form types. It should be understood that the particular shapes of precincts are thus not limited, and such shapes will depend on the criteria used to define a precinct. As an example, in a city such as Toronto, Danforth Avenue exhibits common indicia along the stretch known as "Greektown"—this oblong stretch could be selected as a criteria for a particular precinct. So too, any area where a street exhibits common indicia such that it is desirable or logical to define that street as a precinct. It is also contemplated that new maps can be quickly generated based on user inputted changes to such criteria.

It will now be understood that where a map of the type shown in FIG. 13 is generated for an entire region 44, comparisons of precincts characterized by predominant built form types, and distributions thereof, between different regions 44 can be readily compared. For example, where a map of the type in FIG. 14 is created for Toronto $44_1$, and another for New York $44_3$, (not shown) a comparison can be made of the predominant built form types and their distribution throughout each respective region 44. It should now also be understood that the example map in FIG. 14 includes a broad range of built form types based on the list of built form types shown in Table I. It should be noted, however, that the list in Table I is non-exhaustive, and that other built forms will now occur to those of skill in the art. For example, a semi-permanent, single detached, trailer is an additional type of built form not listed in Table I.

The maps shown in FIGS. 11-14 are primarily directed to built form. In other embodiments of the invention, however, maps can be generated that include information in addition to built form. Such maps include other indicia that can used to be characterize a particular region, including physiographic forms, activity patterns, and use intensity. The addition of physiographic forms is relatively straightforward using existing remote sensing and mapping techniques. Examples of existing commercial packages that can be used as part of performing this addition of physiographic forms include ERDAS Imagine (from Leica Geosystems GIS & Mapping, LLC, Worldwide Headquarters, 2801 Buford Highway, N.E., Atlanta, Ga. 30329-2137 USA) and PCI Geomatics (from 50 West Wilmot Street, Richmond Hill, Ontario Canada, L4B 1M5) for image processing. The commercial packages from ESRI AreGIS (from ESRI, 380 New York Street, Redlands, CA 92373-8100, USA) and Mapinfo (from Mapinfo, 26 Wellington Street East, Suite 500, Toronto, ON M5E 1S2) can be used for mapping.

In the previous embodiment, a certain degree of activity pattern was inferable due to the process of recognizing the built form types—i.e. that houses and apartments indicate an activity of "residence", while office towers indicate an activity pattern of "employment". However, in other embodiments, activity patterns and/or use intensity is added using geospatial and/or demographic data corresponding to the region being mapped. Geospatial data can include information that identifies the geographic location and characteristics of natural or constructed features and boundaries on the earth. Geospatial data information may be derived from, among other things, remote sensing, mapping, and surveying technologies. Demographic data which can be considered a subset of geospatial data, and can include statistics relating births, deaths, ages, incomes etc. that illustrate the conditions of life in a given region 44.

Figure 15:
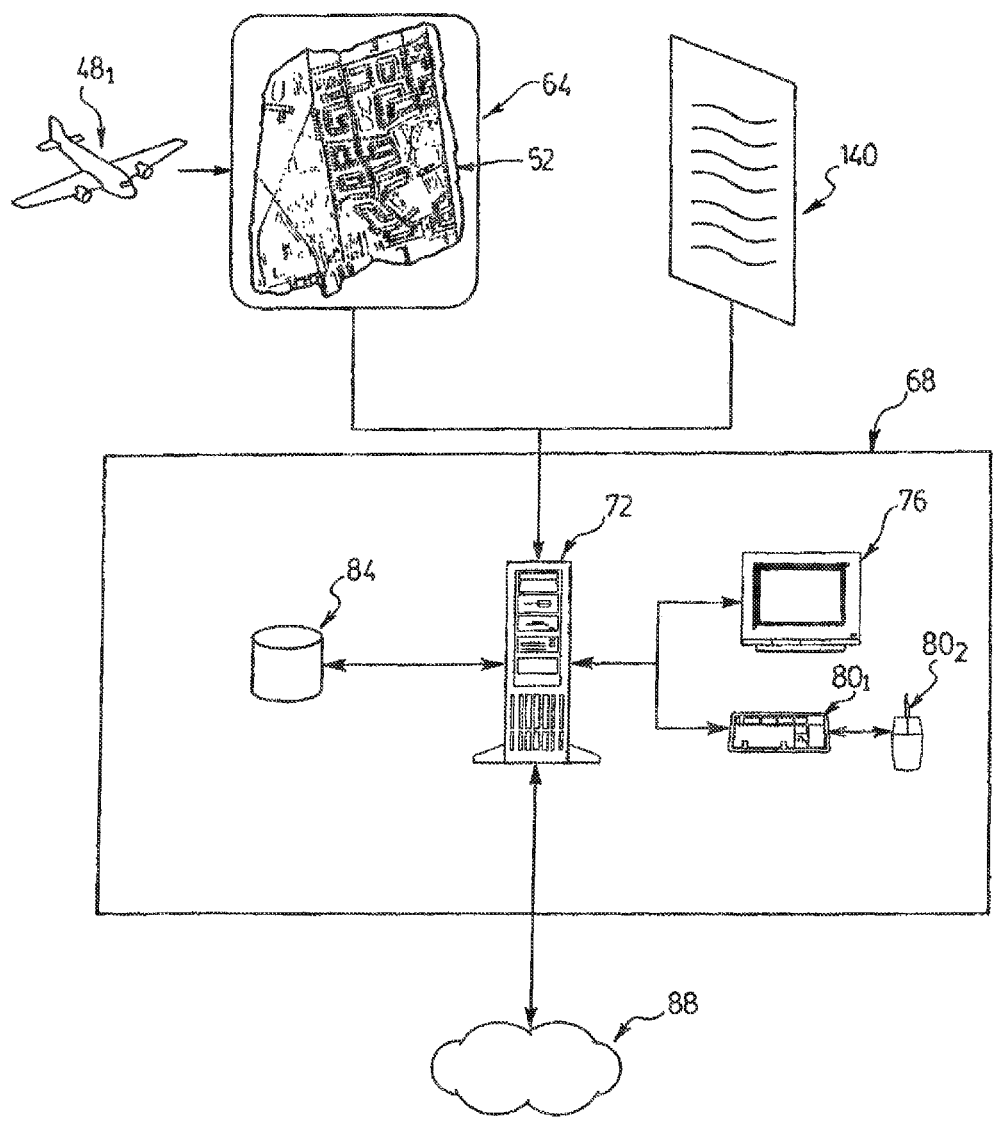
FIG. 15 shows an apparatus for generating a map in accordance with another embodiment of the invention.

As an example of the foregoing, in FIG. 15 demographic data 140 is input into tower 72 in conjunction with data 64 to be used in the generation of an enhanced map. As used herein, the sources of demographic data 140 can be multi-fold, to include data that is collected and maintained by government organizations, such as census data, taxation data, land registry data, employment surveys, and to include data that is collected and maintained by non-government organizations. Thus, the means by which demographic data 140 is actually inputted into tower 72 will depend on the form in which it currently exists, and with appropriate consideration to privacy laws. Thus, as tower 72 receives both demographic data 140 and remote sensed data 64, tower 72 will include further functionality to correlate the physical areas in region 44 and/or area 52 that correlate with the demographic data 140 being collected. (It should be noted that for the sake of privacy, readily-available census data is often aggregated to a spatial unit, e.g. census tract or enumeration area, rather than by address. In order to correlate it with the built form types, the data can be disaggregated and related to the individual buildings.)

Figure 16:
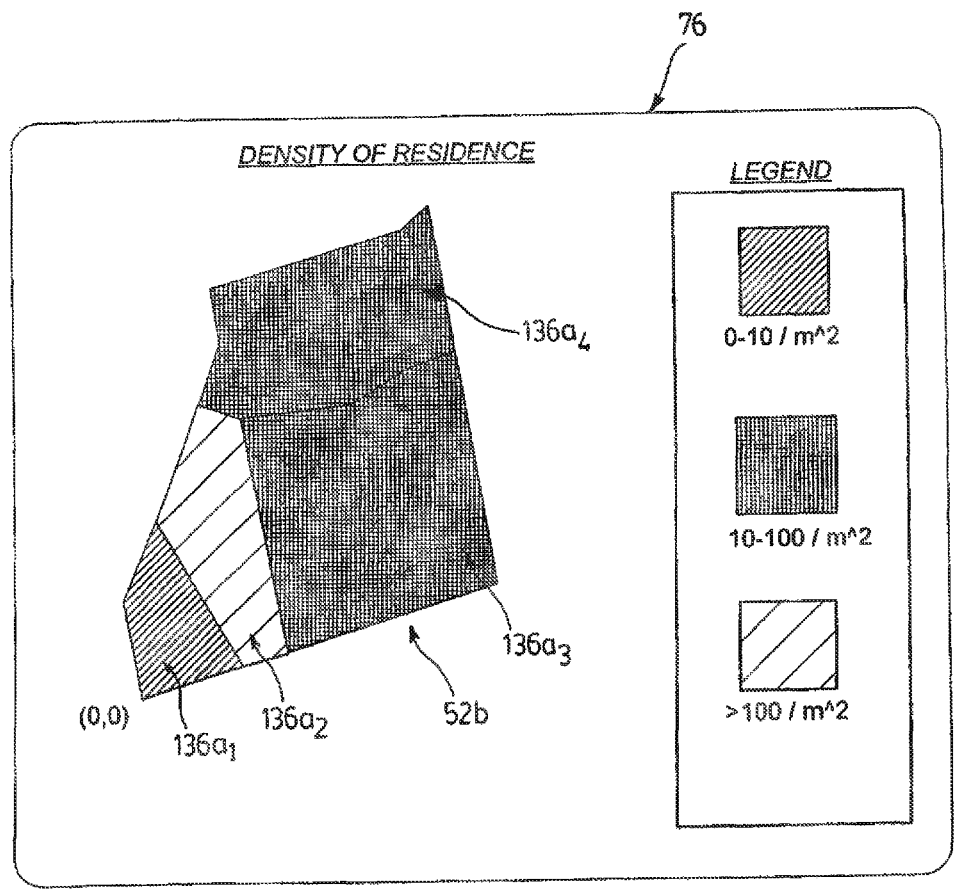
FIG. 16 shows a map of the area in FIG. 9 generated by the apparatus of FIG. 15 and depicting the density of residence in the area.

Thus, one significant source of demographic data 140 that can be used to determine activity patterns and/or intensity of use within region 44, area 52, block 132, or any given built form therein is census data. Census data that includes addresses can be correlated to the built forms detected using method 300. Census data can be used to determine, for example, how many individuals reside in the house identified as object $136_3$ in FIG. 10. In this manner, the density of the population residing within any precinct 136 can be determined. The precinct 136 can then be iconographically represented as a residential precinct, and in a manner that indicates the actual density of people living in that precinct. An example of a map outputted using this data is shown in FIG. 16. Precinct $136a_1$ is indicated to have zero to ten persons per square meter residing in that precinct $136a_1$. Precinct $136a_2$ is indicated to have greater than 100 persons per square meter residing in that precinct $136a_2$. Precincts $136a_3$ and $136a_4$ is indicated to have ten to one-hundred persons per square meter residing in those precincts. It should now be understood that the type of map in FIG. 16 can be expanded to the regional scale, and again readily permit comparisons between different regions 44 for which maps of that type are generated. (Note that while the units of persons per square meter is chosen, and suitable unit can be used, such as persons per hectare, etc.)

As an additional comment however, while the map in FIG. 16 is described as having been generated using demographic data 140, it can also be possible to infer average levels of occupancy based on the determined built form type from Table I, and use that inferred level to develop the map in FIG. 16.

By the same token, other types of demographic data 140 can be used to determine the number of employees working at the office tower identified as object 136 in FIG. 10. Other types of activity patterns, intensity of uses and other indicia to create specific precincts will now occur to those of skill in the art. Table IV below, however, provides an exemplary list of activity patterns, and metrics for intensity of use to accompany those patterns that can be used to generate maps using the teachings herein.

TABLE IV

Activity Patterns and Use Intensity

| Activity | Use Intensity Metric |
|---|---|
| Residence | Average number of persons per square meter residing in precinct |
|  | Average number of persons residing per cubic meter in precinct |
| Employment | Average number of persons per square meter employed in precinct |
| Retail | Number of stores per square meter in precinct |
| Transport | Number of persons using transport through corridor per day |

In general, it should now be understood that maps of regions 44 can be generated using the teachings herein in an automated and relatively efficient manner. Further, it should be understood that such maps, at the regional level, can be generated to include a plurality of precincts, where each of those precincts is uniquely identifiable according to a set of trends or commonalities between a set of indicia that can be used to characterize an urban region. Such precinct maps of regions 44 can be used for urban planning purposes, to compare with other urban regions, and/or in their own right, to determine how best to add, replace and/or maintain infrastructure in an urban region. Precinct maps can be generated according to a specific urban planning project or question. For example, if it is to be determined whether a particular region can support a new subway line, then a precinct map can be generated that identifies residential precincts and employment precincts, with the view to choosing a path for the subway line between such precincts provided that such precincts appear to have populations that are able to support the new subway line. Such precinct maps can also be used for a variety of other planning purposes, including airports, cell phone deployments, new highway construction, sewage and water treatment facilities, power line and supply requirements and the like. Other types of precinct maps for other types of planning purposes will now occur to those of skill in the art.

Figure 17:
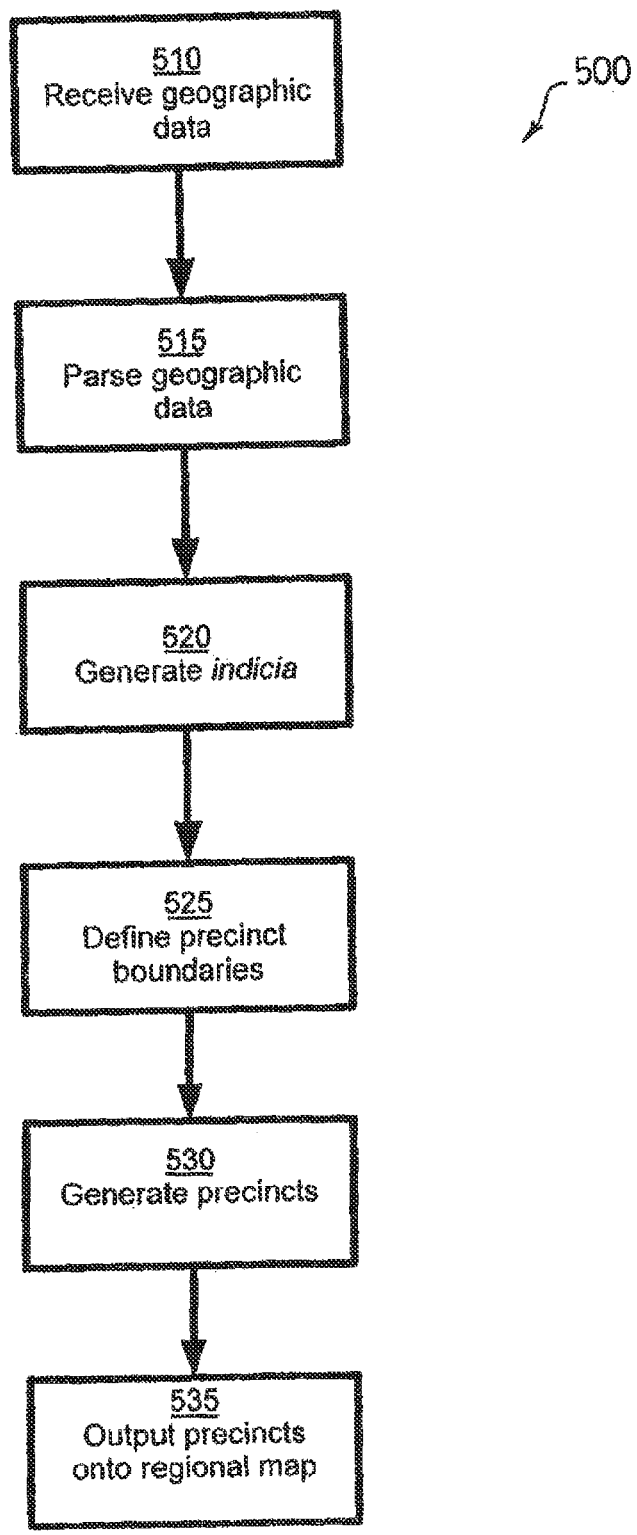
FIG. 17 shows flowchart depicting a method of generating a map in accordance with another embodiment of the invention; and, FIG. 18 shows an exemplary graph that can be generated when performing the method in FIG. 17.

Referring now to FIG. 17, a method for generating a map is indicated generally at 500. Method 500 can be operated using apparatus 68 and the above-described aspects relating thereto. It is to be understood that apparatus 68 and/or method 500 can be varied, and need not work exactly as discussed herein in conjunction with each other. At step 510, geographic data is received. The data can be received as previously described, based on satellite images, or it can be received as existing GIS data. At step 515, the received data is parsed. The data is parsed using any technique that corresponds with the desired types of indicia to be presented in the final map to be generated. One way to parse the data is as previously described with method 300, however, any types of processing techniques, including known image processing and GIS processing techniques can be used. Next, at step 520, indicia are generated and associated with their respective geospatial location in the region of geographic data that was received at step 510. Any type of indicium, or indicia or combinations thereof, can be generated, including built form, activity pattern, intensity of use etc. At step 525, precinct boundaries in the region of geographic data received at step 510 are defined using any desired criteria, such as the criteria previously described. At step 530, the indicia generated at step 520 are aggregated and overlayed onto the defined precincts boundaries to generate a map of the region comprised of precincts that are identified according to the particular chosen set of indicia.

It is to be reiterated that the criteria or other means used to define a precinct are not particularly limited. For example, Tables V-VII show an example of measurements that can be could be generated by apparatus 68, and/or by method 500 for an exemplary precinct on area 52, called "Precinct 1". Precinct "1", may, for example, appear in a map such as the type shown in FIG. 14, Table V relates to intensity measurements of physiography; Table VI relates to intensity measurements of built form; while Table VII relates to intensity measurements of activity. The values associated with each field in the respective table reflect an intensity level, expressed in terms of percentage.

TABLE V

Physiography and Intensity For Precint "1"

| Soil | Tree | Water | Rock |
|---|---|---|---|
| 70% | 10% | 10% | 10% |

TABLE VI

Built Form and Intensity For Precint "1"

| House | Office Tower | Apartment | Road/Highway |
|---|---|---|---|
| 60% | 0% | 15% | 25% |

TABLE VII

Activity and Intensity For Precint "1"

| Residential | Commercial | Residential Road | Major Road |
|---|---|---|---|
| 80% | 0% | 10% | 10% |

Figure 18:
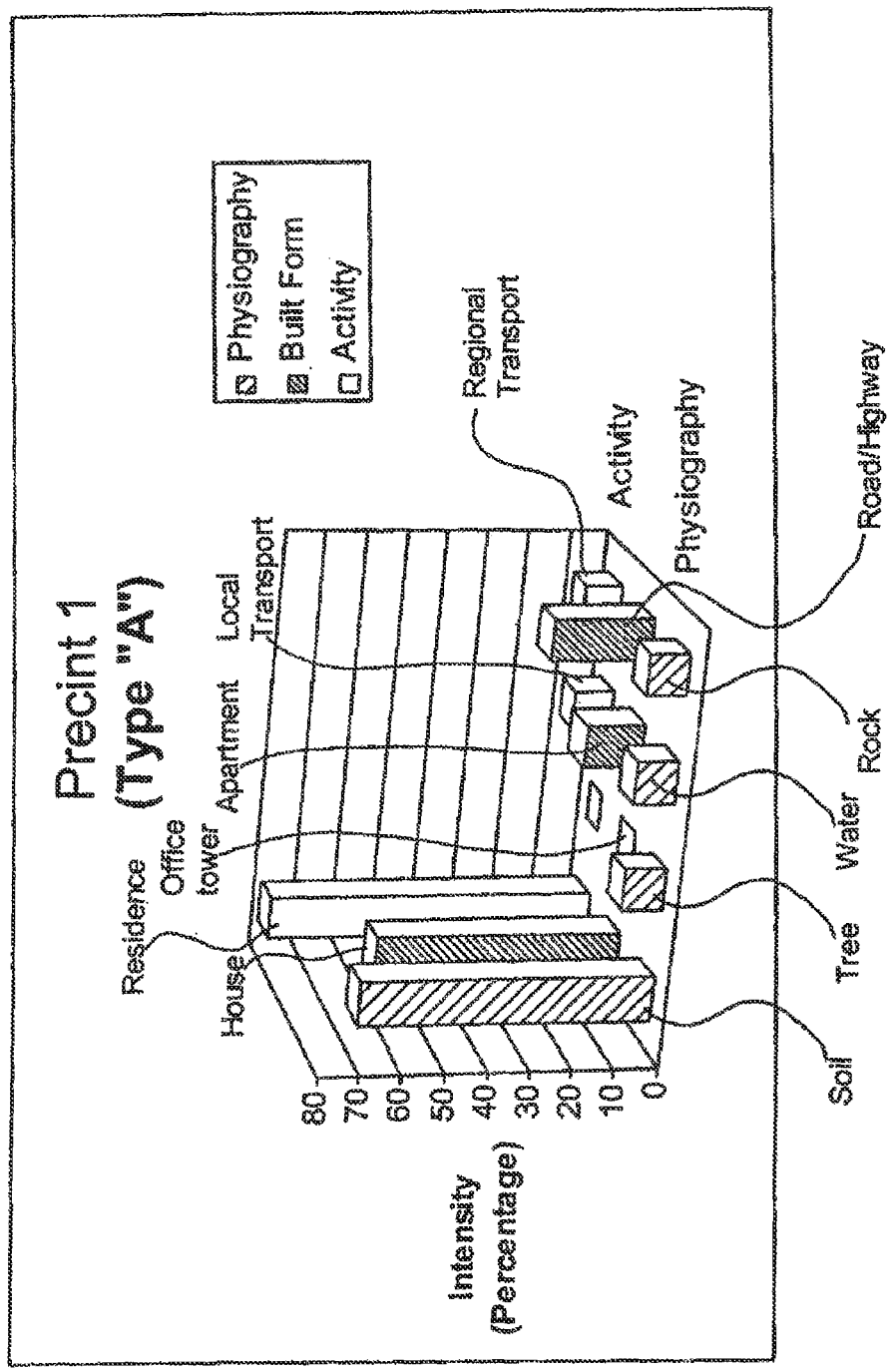

The data gathered in Tables V-VII, when tabulated by apparatus 68, can result in a graph of the type shown in FIG. 18, which is characterized as a precinct of type "A". Such characterizing of Precinct "1" as of being type "A" can be based on certain threshold percentages for each type/category of indicia and associated intensity. An example of such threshold values is shown in Table VIII.

TABLE VIII

Threshold values for Precincts of type "A"

| Physiography | | | |
|---|---|---|---|
| Soil | Tree | Water | Rock |
| Minimum 60%, Maximum 80% | Minimum 0% Maximum 10% | Minimum 0% Maximum 10% | Minimum 0% Maximum 10% |

| Built Form | | | |
|---|---|---|---|
| House | Office Tower | Apartment | Road/Highway |
| Minimum 50%, Maximum 90% | Minimum 0% Maximum 10% | Minimum 0% Maximum 20% | Minimum 15% Maximum 40% |

| Activity | | | |
|---|---|---|---|
| Residential | Commercial | Residential Road | Major Road |
| Minimum 70% Maximum 100% | Minimum 0% Maximum 10% | Minimum 10% Maximum 20% | Minimum 0% Maximum 10% |

Thus, using the threshold values for a precinct of type "A", (and/or a plurality of different precinct types) maps of different urban regions can be generated to locate where there are common precincts of type "A". Other uses for obtaining maps that identify precincts will now occur to those of skill in the art. By the same token, it will now occur to those of skill in the art that any number and combinations of different types of indicia can be used. Furthermore, while Tables V-VIII all refer to percentages of intensity, it should also be understood that Tables can merely look for the presence or absence of a particular type of indicia.

While only specific combinations of the various features and components of the present invention have been discussed herein, it will be apparent to those of skill in the art that desired subsets of the disclosed features and components and/or alternative combinations of these features and components can be utilized, as desired. For example, other means of remotely sensing data can be used—e.g. electronic survey conducted by internet, involving the distribution of a survey to individual subscribers who own a particular building within the region being surveyed.

It should now be apparent to those of skill in the art that the present invention provides a novel Geographic Information System ("GIS"). It is also to be understood that method 300 is but one particular way of interpreting remotely sensed data to generate the types of maps in FIGS. 11, 12, 13, 14 and 16 and variations and/or combinations thereof, and that additional methodologies can be employed, as desired. For example, another approach is to first use geospatial data to segment or parse areas in the remotely sensed data into "manageable" units that exhibit similar characteristics. Next, census tracts are located in the region that have a high population density by analyzing that variable for the entire region using an off-the-shelf GIS. Next, if it is assumed that that high population densities are the result of a high built form density, e.g. high-rise tower or slab apartments, the RS data for those same census tracts can be isolated and examined. The derived built form can then be verified using other imagery data (e.g. aerial photography) and presented using metrics that characterize a particular built form, i.e. high-rise tower or slab apartments. In this instance geospatial data informs the remotely sensed data and is usable in the assumptions about characteristics of built form. In general, any geospatial feature and tabular data that can be obtained and used to infer built form can be employed in other embodiments of the invention.

Further, while the built form maps of FIGS. 13 and 14 are one type of output that can be generated using the present invention, it should now also be understood that determined built forms can also be used to infer certain activities, and/or intensities thereof, and/or other indicia used to generate other types precinct maps for region 44.

In a further embodiment of the invention, maps of type shown in FIGS. 11, 12, 13, 14 and 16, and other maps showing other indicia, can be generated for a given period of time, and then "played back" to the viewer to show an animation of change over time of a particular region, or portion thereof.

Another particular embodiment of the present invention is the standardization of measurements used to create precincts for multiple regions 44, so that ready comparisons can be made between different regions 44. The measurements used to identify any particular precinct can be based on any one or more of the indicia of physiographics, built form, activity patterns, etc. and/or intensities and/or combinations thereof, in conjunction with area, volume or other geographic metrics of a particular region. For example, a measurement can include a ratio of one type of an activity pattern to another type of activity pattern for a give area.

The teachings herein can have a broad range of applications, in particular for use in urban planning and commercial applications. For example:

1. Standardized maps can be provided of the indicia associated with different regions. These can be useful to urban specialists and to the general public, in providing an understanding.
2. Comparisons between these regions can be readily performed due to the standardized approach to create such maps.
3. Growth patterns of a particular region can be recognized through the identification at regular intervals of the extent and classification of new precincts and of changes in established areas (with regard to built form, activities and intensities).
4. Strategic investment decisions can be made for an urban regions—in office, retail or residential development, or in land, or for house or other built form purchases
5. Measuring the densities of development, both gross and net, and in particular for measuring new development.
6. Identification of opportunities across a region for urban intensification can be performed. For example, by identifying vacant or underused lands around subway or light-rail stations.
7. As a means of assessing effects of new investments in infrastructure (e.g. a rail line) or a sectoral investment (such as a "big box" retail centre).
8. At the urban regional level, the embodiments herein can be used as a basis and tool for constructing consistent, comprehensive and sufficiently informative regional growth plans for infrastructural investments (public transport, roads, sewerage, water, etc.) and the necessary accompanying strategies for the deployment of buildings and activities. An example of the importance of this understanding is that the United States government has recently begun to require of all urban regions that they have regional strategies that promote increased reliance on public transportation if they are to receive allocations from the Highway Fund for capital transportation, purposes. This requires a region to obtain regional understandings of its component precincts, activities and movement patterns, and the present and anticipated intensities. Thus, the teachings herein can be incorporated into broader methodologies used to perform actual urban planning and as part of formulas used to calculate government grant allocations.

The present invention provides a novel system and method for mapping. The maps generated according to the teachings herein provide frameworks to understand, at the regional scale, the existing patterns and trends of built form and activities, and their intensity; and the patterns of communications. Since, in these respects, urban regions vary greatly, prior art technique do not allow for ready comparisons of different urban regions. For example, the Ranstadt region (composed of Amsterdam, Rotterdam, the Hague and other cities) is poly-nuclear. The London region is highly concentric. The Pearl River Delta (probably the world's largest urban region) tends to be a carpet of highly mixed activity, with several highly compact and intensive nodes (Hong Kong, Shenzhen, Guangzhou, Zhuhai). Again, Toronto has an unusually compact centre and low-density suburban periphery, a pattern that appears to be in the process of reinforcement with very low density exurban extensions and a great wave of central urban intensification. Toronto, like virtually all North American urban regions has, in the past four decades, experienced an explosion of suburban office space, most of it located in a large number of small and moderately-sized low density clusters along major highways and freeways. In North American urban regions this kind of office sprawl now constitutes, more or less, half of the regional office space. The present invention provides a novel system and method for generating maps to understand the aforementioned conditions and patterns. Maps generated using the teachings herein can be provided that allow ready comparisons between different regions, on a consistent, comprehensive, efficient and/or low cost basis. This is generally not possible using prior art mapping techniques of in urban regions, nor is it possible to provide a level of information that provides a ready and proper basis for land use/transport policy and program formulation.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. An apparatus for generating a map comprising:
   means for receiving:
      a first set of data of an urban region representing physiographic characteristics,
      a second set of data of said urban region representing different types of built forms and their locations and
      a third set of data of said urban region representing patterns of human activity inferred from said different types of built forms, said activity associated with both said physiographic characteristics and said built forms;
   means for determining different types of entities for each said set of data; and
   means for generating a representation of at least one precinct;
   each precinct occupying an area less than an area of said map;
   each precinct comprising indicia respective to each set of data that corresponds to said entities.

2. The apparatus of claim 1 wherein said indicia is presented in a graphical form that includes a plurality of precincts, each of said precincts defined by areas within said region that have a predefined set of common indicia.

3. The apparatus of claim 1 further comprising the step of associating an intensity level associated with each set of indicia.

4. The apparatus according to claim 1 wherein said first set of data and said second set of data are obtained from remotely sensed data sources.

5. The apparatus according to claim 1 wherein said third set of data is obtained from census data.

* * * * *